United States Patent
Okamoto et al.

(10) Patent No.: US 8,166,555 B2
(45) Date of Patent: Apr. 24, 2012

(54) CONTENT REPRODUCING DEVICE AND CONTENT PREPRODUCING METHOD

(75) Inventors: Ryuichi Okamoto, Osaka (JP); Tohru Nakahara, Osaka (JP); Kouji Miura, Osaka (JP); Masaya Yamamoto, Arcadia, CA (US); Masaki Igarashi, Osaka (JP); Katsumi Tokuda, Osaka (JP)

(73) Assignee: Panasonic Corporation, Osaka (JP)

( * ) Notice: Subject to any disclaimer, the term of this patent is extended or adjusted under 35 U.S.C. 154(b) by 1050 days.

(21) Appl. No.: 11/660,327

(22) PCT Filed: Aug. 19, 2005

(86) PCT No.: PCT/JP2005/015140
§ 371 (c)(1),
(2), (4) Date: Mar. 21, 2008

(87) PCT Pub. No.: WO2006/019158
PCT Pub. Date: Feb. 23, 2006

(65) Prior Publication Data
US 2008/0263582 A1    Oct. 23, 2008

(30) Foreign Application Priority Data
Aug. 20, 2004 (JP) .................................. 2004-240914

(51) Int. Cl.
*G06F 7/04* (2006.01)
(52) U.S. Cl. .............. 726/26; 726/27; 726/30; 713/189; 713/193; 386/263; 714/48; 714/704
(58) Field of Classification Search .................. 386/263; 713/155, 158, 189, 193; 714/48, 704, 406; 726/5–7, 26, 27, 30
See application file for complete search history.

(56) References Cited

U.S. PATENT DOCUMENTS

| 7,760,988 B2 * | 7/2010 | Yamamoto et al. ........... 386/244 |
| 7,933,409 B2 * | 4/2011 | Yamamoto et al. ........... 380/201 |
| 2004/0034786 A1 | 2/2004 | Okamoto et al. |
| 2005/0203853 A1 * | 9/2005 | Yamamoto et al. ............. 705/59 |
| 2006/0005257 A1 * | 1/2006 | Tohru et al. ..................... 726/27 |
| 2008/0160910 A1 * | 7/2008 | Khedouri et al. ............ 455/3.06 |
| 2008/0263582 A1 | 10/2008 | Okamoto et al. |

FOREIGN PATENT DOCUMENTS

| JP | 2003-58406 | 2/2003 |
| JP | 2003-272286 | 9/2003 |
| JP | 2004-46809 | 2/2004 |

OTHER PUBLICATIONS

Chinese Office Action issued Jun. 7, 2010 in Chinese Patent Application No. 200910140174.7.

* cited by examiner

*Primary Examiner* — Nabil El Hady
(74) *Attorney, Agent, or Firm* — Wenderoth, Lind & Ponack, L.L.P.

(57) ABSTRACT

When a secure counter malfunction detection unit 212 deters a malfunction in a secure counter 211, a content playability judgment unit 206 performs a content playability judgment based on information managed by a malfunctioning-state playback processing management unit 214. The malfunctioning-state playback processing management unit 214 stores a malfunctioning-state playback condition composed of information such as a playback count and a playback time. The content playability judgment unit 206 judges that content is playable when the malfunctioning-state playback condition is met, and a content playback unit 210 splays the content.

21 Claims, 31 Drawing Sheets

FIG. 4

110 USER INFORMATION DATABASE

| | USER ID | TERMINAL ID | NAME | PAYMENT INFORMATION |
|---|---|---|---|---|
| 111 | 0001 | 000111 | AA | 00012 |
| | | 001234 | | |
| 112 | 0002 | 000001 | BB | 40002 |
| 113 | 0003 | 000012 | CC | 60001 |
| | ⋮ | ⋮ | ⋮ | ⋮ |

FIG. 5

120 CONTENT USAGE RIGHTS DATABASE

| USER ID | CONTENT ID | CONTENT KEY | USAGE TIME LIMIT |
|---------|------------|-------------|------------------|
| 0001 | 111111 | 000001 | UNLIMITED |
| 0002 | 222221 | 000002 | 2004/12/31 12:00 |
| 0002 | 222221 | 000002 | 2004/12/31 24:00 |
| 0003 | 434444 | 033333 | 2004/11/30 12:00 |
| ... | ... | ... | ... |

FIG. 8

220 LICENSE DATABASE

| CONTENT ID | CONTENT KEY | USABILITY COUNTER UPPER LIMIT | USABILITY COUNTER UPPER LIMIT RELIABILITY LEVEL |
|---|---|---|---|
| 111111 | 000001 | UNRESTRICTED | RELIABLE |
| 222221 | 000002 | 01000 | UNRELIABLE |
| 222224 | 000004 | 00800 | UNRELIABLE |
| ... | ... | ... | ... |

FIG. 10A

250 MALFUNCTIONING-STATE PLAYBACK CONDITIONS

| | | |
|---|---|---|
| MALFUNCTIONING-STATE PLAYBACK PERMITTED COUNT | 10 | 251 |
| MALFUNCTIONING-STATE PLAYBACK PERMITTED TIME | 30 HRS | 252 |
| MALFUNCTIONING-STATE PLAYBACK PERMITTED CONTENT COUNT | 5 | 253 |
| MALFUNCTIONING-STATE PLAYBACK PERMITTED ELAPSED TIME | 24 HRS | 254 |

FIG. 10B

260 MALFUNCTIONING-STATE PLAYBACK HISTORY

| | | |
|---|---|---|
| MALFUNCTIONING-STATE PLAYBACK COUNT | 4 | 261 |
| MALFUNCTIONING-STATE PLAYBACK TIME | 4 HRS 30 MINS | 262 |
| MALFUNCTIONING-STATE PLAYBACK CONTENT COUNT | 2 | 263 |
| PLAYED CONTENT ID | 111111 | 264 |
| | 222221 | 265 |

| | |
|---|---|
| MALFUNCTION ELAPSED TIME | 12 HRS 10 MINS |

FIG. 21

120a CONTENT USAGE RIGHTS DATABASE

| USER ID | CONTENT ID | CONTENT KEY | USAGE TIME LIMIT | DEFERRED-PAYMENT BILLING PERMISSIBILITY INFORMATION |
|---------|------------|-------------|------------------|------------------------------------------------------|
| 0001    | 111111     | 000001      | UNLIMITED        | NOT PERMITTED                                        |
|         | 222221     | 000002      | 2004/12/31 12:00 | PERMITTED                                            |
| 0002    | 222221     | 000002      | 2004/12/31 24:00 | NOT PERMITTED                                        |
| 0003    | 434444     | 033333      | 2004/11/30 12:00 | NOT PERMITTED                                        |
| ...     | ...        | ...         | ...              | ...                                                  |

FIG. 24

220a LICENSE DATABASE

| CONTENT ID | CONTENT KEY | USABILITY COUNTER UPPER LIMIT | USABILITY COUNTER UPPER LIMIT RELIABILITY LEVEL | DEFERRED-PAYMENT BILLING PERMISSIBILITY INFORMATION |
|---|---|---|---|---|
| 111111 | 000001 | UNRESTRICTED | RELIABLE | NOT PERMITTED |
| 222221 | 000002 | 01000 | UNRELIABLE | PERMITTED |
| 222224 | 000004 | 00800 | UNRELIABLE | NOT PERMITTED |
| ... | ... | ... | ... | ... |

250a DEFERRED-PAYMENT BILLING INFORMATION DATABASE

| CONTENT ID | PLAYBACK COUNTER VALUE 255a | PLAYBACK COUNTER VALUE RELIABILITY LEVEL 256a | |
|---|---|---|---|
| 111111 | 000100 | RELIABLE | 251a |
| 222221 | 000150 | RELIABLE | 252a |
| 222221 | 000195 | UNRELIABLE | 253a |
| ⋮ | ⋮ | ⋮ | |

254a points to 111111

OPERATIONS FOR DEFERRED-PAYMENT BILLING INFORMATION UPLOAD PROCESSING

CONTENT REPRODUCING DEVICE AND CONTENT PREPRODUCING METHOD

TECHNICAL FIELD

The present invention relates to a playback apparatus and a playback method for playing content whose copyrights are protected.

BACKGROUND ART

In recent years, content distribution systems that use Digital Rights Management (DRM) techniques are becoming common. With DRM, encrypted content and a license are distributed to a user terminal. The license includes a content key and one or more content usage conditions, and the user terminal judges whether or not the content is able to be used in accordance with the usage conditions, and when the content is usable, decrypts the encrypted content using the content key and plays the content.

When a playable time period is listed as a usage condition, the judgment of whether the content is playable by the user terminal is made based on time information provided by a clock in the terminal. Consequently, in order to perform the judgment appropriately, it is necessary for the time information provided by the clock to be accurate.

However, it is possible that the clock may provide incorrect time information due to, for instance, power to the clock being temporarily cut. In such a case, the user terminal will be unable to make an appropriate judgment as to whether or not the content is usable, and will potentially permit usage of content when usage of the content is not actually permitted.

Patent Document 1 discloses a technique for solving this kind of problem. With the technique of Patent Document 1, usage of content is prohibited when a clock malfunction such as power to the clock being cut is detected and it is judged that the clock cannot provide accurate time information.

Patent Document 1: Japanese Patent Application Publication No. 2003-272286

DISCLOSURE OF THE INVENTION

Problem to be Solved by the Invention

However, with the above-described technique, when a clock malfunction is detected and it is judged that the clock cannot provide accurate time information, usage of content is prohibited. This means that it is possible that even if a user has paid to use the content, the content may be not able to be used even if the current time falls within in a time period in which the content should actually be able to be used. This situation is unfavorable from the point of view of convenience and satisfaction on the part of the user.

The present invention was conceived in view of the described problem, and has an object of providing a content playback apparatus and a content playback method that, taking user convenience into consideration, determine with a degree of flexibility whether or not content is usable, even if there is difficulty in providing accurate time information due to a clock malfunction or the like.

Means to Solve the Problem

In order to achieve the stated object, the present invention is a content playback apparatus including: a license storage unit operable to store a usable time period showing a time period for which content is usable; a measurement unit operable to measure time; a determination unit operable to determine that playback is possible when the time measured by the measurement unit is within the usable time period; a playback unit operable to play the content when the determination unit judges that playback is possible; and a malfunction detection unit operable to detect a malfunction of the measurement unit, wherein the determination unit, when the malfunction detection unit detects the malfunction, judges whether or not a predetermined condition is met, and when the predetermined condition is judged to be met, determines that playback of the content is permitted.

Effects of the Invention

According to the content playback apparatus of the present invention, even when the reliability level of the time measured by the measurement unit is low due to a reason such as power to the measurement unit being cut, the content is played if a predetermined condition is met. Therefore, the present invention improves convenience for the user in the case of the reliability level of the time measured by the measurement unit being low, compared to a conventional apparatus that prohibits playback in such a case.

Furthermore, in accordance with the predetermined condition it is possible to avoid to an extent a situation in which, despite the user having paid to use the content and the current time being within the usable time period, the content is unable to be played due to a malfunction.

Here, the license storage unit may store license information that includes the usable time period and key information, the key information being for decrypting the content that is in an encrypted state, and the playback unit, when the determination unit determines that playback is possible, may acquire the encrypted content, decrypt the encrypted content to generate the content, and play the generated content.

According to the stated structure, the content is in an encrypted state, and is decrypted when the determination unit determines the content to be playable. Therefore, the content can be treated securely.

Here, the content playback apparatus may be connected via a network to a license server that is a distribution source of the license information, and the content playback apparatus may further include: a license requesting unit operable to, upon the malfunction detection unit detecting the malfunction, issue a request to the license server to retransmit the license information; and a reacquisition unit operable to reacquire the license information from the license server, only when a current time is within the usable time period, wherein the determination unit determines that playback is possible when the reacquisition unit reacquires the license information.

According to the stated structure, when the content playback apparatus is unable to determine appropriately whether the current time is within the usable time period appropriately due to the malfunction of the measurement unit, the content playback apparatus is able to entrust the determination to the license server.

Here, the determination unit may judge whether or not the condition is met by a playback history, the playback history being a record of content playback by the playback unit while the malfunction of the measurement unit existed in the past, and determine that playback is possible when the condition is met by the playback history.

In the content playback apparatus of the present invention, playback of the content is permitted if a predetermined condition is met, even if the current time falls after the usable time period. According to the stated structure, the determination unit is able to perform the determination using the playback history, and therefore unlimited playback of content outside the usable time period can be suppressed.

Here, the determination unit may include: a condition storage subunit operable to store a predetermined count as the condition; a history management subunit operable to manage a playback count as the playback history; and a judgment subunit operable to compare the predetermined count and the playback count, and when the playback count is less than the predetermined count, judge that the condition is met, wherein the history management subunit updates the playback count upon the determination subunit determining that the condition is met.

According to the stated structure, the determination unit determines whether or not content is playable based on the number of times that content has been played while a malfunction exists in the measurement unit. Therefore, a content playback apparatus can be provided that fulfills the wishes of the user in terms of convenience and satisfaction, while suppressing unrestricted content playback exceeding a predetermined number of times.

Here, the determination unit may include: a condition storage subunit operable to store a predetermined time length as the condition; a history management subunit operable to manage a playback time length as the playback history; and a judgment subunit operable to compare the predetermined time length and the playback time length, and when the playback time length is shorter than the predetermined time length, judge that the condition is met, wherein the history management subunit, upon the judgment subunit judging that the condition is met, commences measuring time and updates the playback time length.

According to the stated structure, the determination unit determines whether or not content is playable based on a time length for which content has been played while a malfunction exists in the measurement unit. Therefore, a content playback apparatus can be provided that fulfills the wishes of the user in terms of convenience and satisfaction, while suppressing unrestricted content playback exceeding a predetermined time length.

Here, the determination unit may include: a condition storage subunit operable to store a predetermined content count as the condition; a history management subunit operable to manage a played content count as the playback history, the played content count being a total number of content that the playback unit has played in the past; and a judgment subunit operable to compare the predetermined content count and the played content count, and when the played content count is less than the predetermined content count, judge that the condition is met.

According to the stated structure, the determination unit determines whether or not content is playable based on how many contents have been played while a malfunction exists in the measurement unit. Therefore, a content playback apparatus can be provided that fulfills the wishes of the user in terms of convenience and satisfaction, while suppressing unrestricted content playback exceeding a predetermined number of contents.

Here, the license storage unit may store the license information that includes the usable time period, the key information and content identification information, the content identification information identifying the content, the history management subunit may further store, as the playback history, content identification information that identifies content played in the past, and the history management subunit, when the determination subunit determines that the condition is met, may judge whether or not the content identification information stored in the history management subunit already includes content identification information identifying the content identified by the content identification information included in the license information, and when the stored content identification information does not include content identification information identifying the content identified by the content identification information included in the license information, further store content identification identifying the content identified by the content identification information included in the license information, and update the played content count.

According to the stated structure, by storing content IDs identifying content played while the malfunction exists in the measurement unit, the determination unit is able to accurately grasp the how many contents have been played while the malfunction exists in the measurement unit.

Here, the determination unit may include: a malfunction elapsed time measurement subunit operable to measure a malfunction elapsed time that is time elapsed from when the malfunction detection unit detects the malfunction; a condition storage subunit operable to store a predetermined time length as the condition; and a judgment subunit operable to compare the malfunction elapsed time and the predetermined time length, and when the malfunction elapsed time is less than the predetermined time length, judge that the condition is met.

Furthermore, the determination unit may include: a malfunction count management subunit operable to manage a malfunction count that is a total number of times that the malfunction detection unit has detected the malfunction; a condition storage subunit operable to store a predetermined count as the condition; and a judgment subunit operable to compare the malfunction count and the predetermined count, and when the malfunction count is less than the predetermined count, judge that the condition is met.

According to the stated structure, when, for instance, the malfunction elapsed time is relatively short or the malfunction count is relatively high, it is assumed that a malicious user has intentionally stopped the functions of the measurement unit. In this case playback of content can be suppressed.

Here, the determination unit may store attribute information showing an attribute of the content playback apparatus, and judge whether or not the attribute information meets the predetermined condition.

At the present time, there are various apparatuses having a content playback function that are being manufactured and are on the market. With the stated structure, the determination of whether or not content is playable can be made in compliance with various apparatuses.

Here, the determination unit may store the attribute information that shows one of (a) an online device that is normally connected to a network and (b) an offline device that is normally not connected to a network.

An online device that is a non-portable device that is normally connected to a network, and an offline device such as a PDA or a mobile telephone that is able to be carried and used outside the home have greatly differing properties in terms of whether or not they are normally able to communicate with a license server. According to the stated structure, a determination of whether or not playback is possible can be made in light of this property.

Furthermore, the present invention is a content playback apparatus, including: a license storage unit operable to store a usable time period showing a time period for which content is usable; a measurement unit operable to measure time; a determination unit operable to determine that playback is possible when the time measured by the measurement unit is within the usable time period; a playback unit operable to play the content when the determination unit judges that playback is possible; and a malfunction detection unit operable to detect a malfunction of the measurement unit, wherein the determination unit, when the malfunction detection unit detects the malfunction, judges whether or not billing information relating to billing is to be generated, and when it is judged that the billing information is to be generated, determines that playback of the content is permitted.

According to the stated structure, an enterprise that distributes content, licenses and the like to the content playback apparatus is able to bill the user of the content usage apparatus based on the billing information generated by the content playback apparatus.

Furthermore, unlike a conventional apparatus that prohibits playback of content without exception when a malfunction exists in the measurement unit, with the stated structure, although there is a possibility that the user will be billed, the content can be played even if a malfunction exists in the measurement unit. This improves convenience for a user who wishes to view or listen to content.

Here, the license storage unit may store license information that includes the usable time period and billing permissibility information, the billing permissibility information showing whether or not the billing information is to be generated, and the determination unit may include: a determination subunit operable to determine, in accordance with the billing permissibility information included in the license information, whether or not the billing information is to be generated; and a billing information generation subunit operable to generate the billing information when the determination subunit determines that the billing information is to be generated.

According to the stated structure, the determination of whether or not to generate billing information with respect to the content playback apparatus can be made according to a judgment by an enterprise that distributes content, licenses and the like to the content playback apparatus.

Here, the billing information generation subunit may read from the measurement unit a value that shows elapsed time, and generate the billing information so as to include the read value and reliability level information showing whether or not the value is reliable.

According to the stated structure, the enterprise that distributes content, licenses and the like to the content playback apparatus can judge whether or not it is necessary to bill the user of the content usage apparatus based on the reliability level information and the value read from the measurement unit that are included in the billing information generated by the content playback apparatus.

Here, the content playback apparatus may further include: a billing information transmission unit operable to transmit the billing information generated by the billing information generation subunit to a billing server.

According to the stated structure, the enterprise that distributes content, licenses and the like to the content playback apparatus receives the billing information transmitted by the content playback apparatus, and bills the user of the content usage apparatus based on the received billing information.

BRIEF DESCRIPTION OF THE DRAWINGS

FIG. 4 shows the data structure of a user information database 110;
FIG. 5 shows the data structure of a content usage rights database 120;
FIG. 8 shows the data structure of a license database 220;
FIG. 10A shows malfunctioning-state playback conditions 250,
FIG. 10B shows a malfunctioning-state playback history 260,
and FIG. 10C shows a malfunction elapsed time 270;
FIG. 21 shows the data structure of a content usage rights database 120a;
FIG. 22 shows the data structure of a license issue request response 140a;
FIG. 24 shows the data structure of a license database 220a;
FIG. 25 shows the data structure of a deferred-payment billing information database 250a;
FIG. 26 shows the data structure of a deferred-payment billing information upload request 260a.

Figure 1:
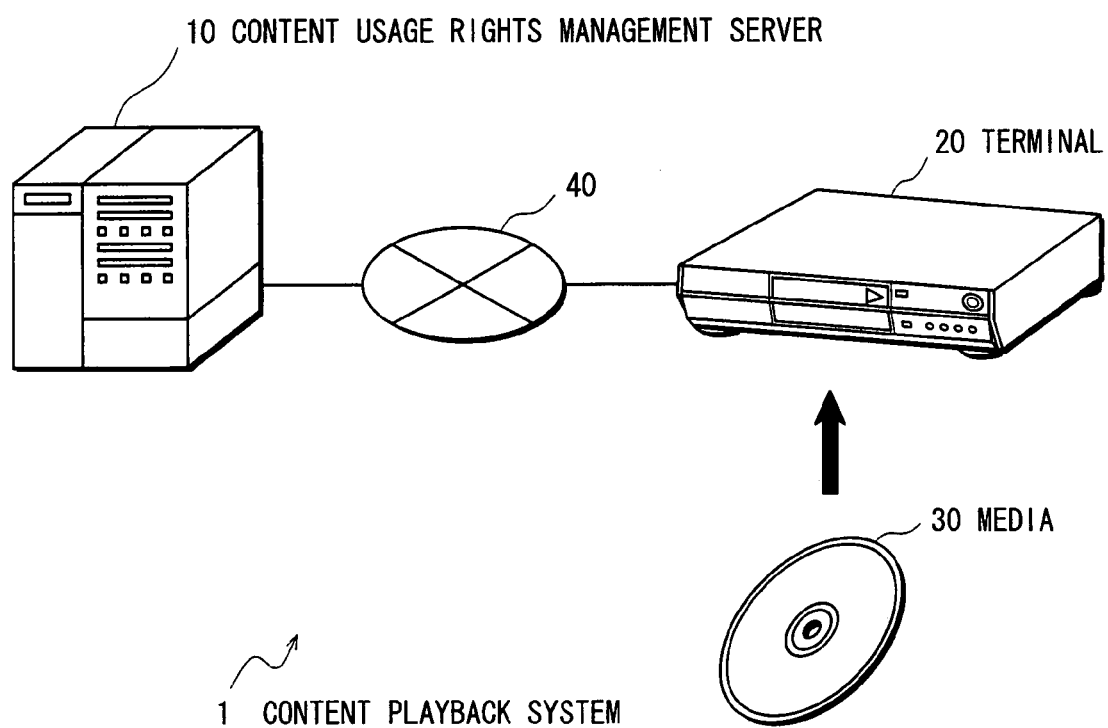
FIG. 1 is a structural diagram of a content playback system 1 that is a first embodiment.

DESCRIPTION OF NUMERICAL REFERENCES 1 content playback system
10 content usage rights management server
10a content usage rights management server
20 terminal
20a terminal
30 media 30a media
40 transmission path
40a transmission path
101 user information storage unit
101a user information storage unit
102 content usage rights storage unit
102a content usage rights storage unit
103 content usage rights transmission unit
103a content usage rights transmission unit
104 license generation unit
104a license generation unit
105 communication unit
105a communication unit
106a deferred-payment billing processing execution unit
201 license storage unit
201a license storage-unit
202 communication unit
202a communication unit
203 terminal ID storage unit
203a terminal ID storage unit
204 license acquisition unit
204a license acquisition unit
205 display unit
205a display unit
206 content playability judgment unit
206a content playability judgment unit
207 content key acquisition unit
207a content key acquisition unit
208 content acquisition unit
208a content acquisition unit
209 content decryption unit
209a content decryption unit
210 content playback unit
210a content playback unit
211 secure counter
211a secure counter
212 secure counter malfunction detection unit
212a secure counter malfunction detection unit
213 malfunctioning-state processing execution unit
213a malfunctioning-state processing execution unit
214 malfunctioning-state playback processing management unit
215a deferred-payment billing information storage unit
216a deferred-payment billing information upload unit

BEST MODE FOR CARRYING OUT THE INVENTION

First Embodiment

The following describes a content playback system 1 that is a first embodiment of the present invention with reference to the drawings.
<Structure>
1. Overview of System
FIG. 1 shows the overall structure of the content playback system 1. As shown in FIG. 1, the content playback system 1 is composed of a content usage rights management server 10, a terminal 20, and media 30. The content usage rights management server 10 and the terminal 20 are connected to each other via a transmission path 40, and the media 30 is used mounted in the terminal 20.
The media 30 stores content therein, and the content usage rights management server 10 is possessed by an enterprise that manages usage rights of the content stored in the media 30. The terminal 20 and the media 30 are possessed by a user.

Figure 2:
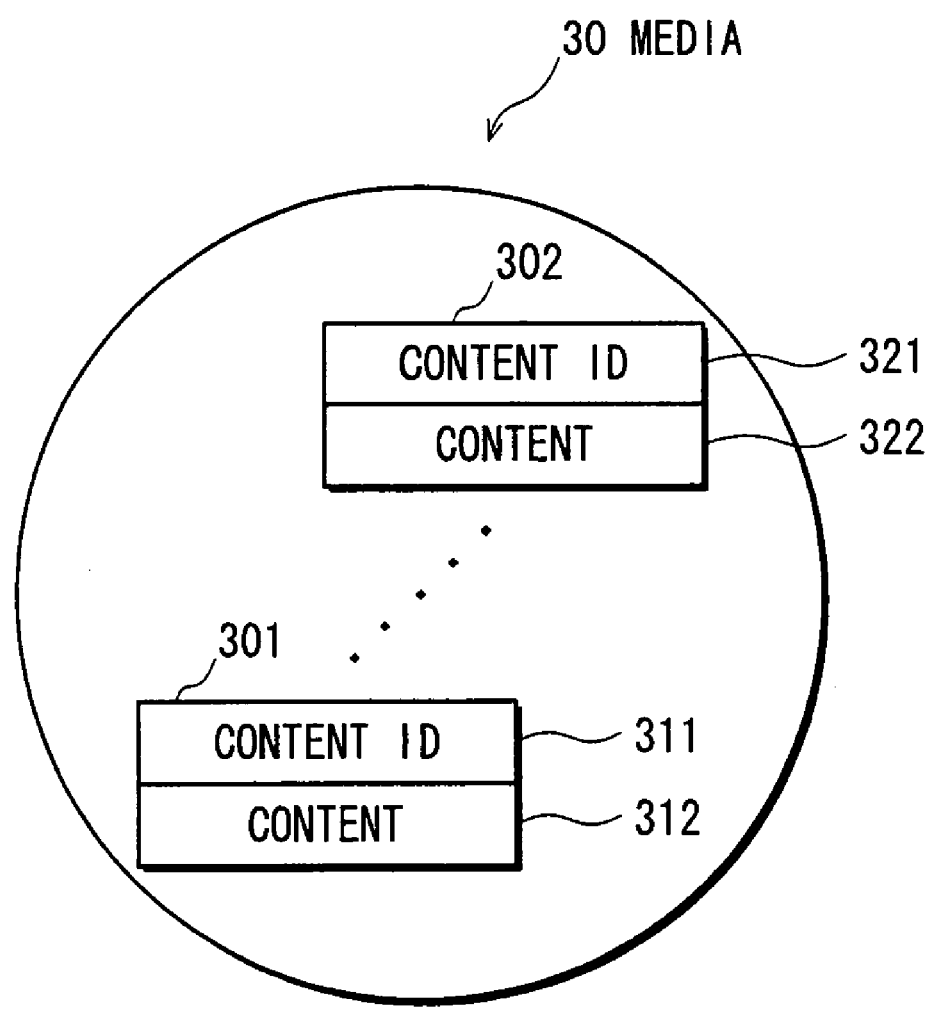
FIG. 2 shows data recorded on a media 30.
Figure 3:
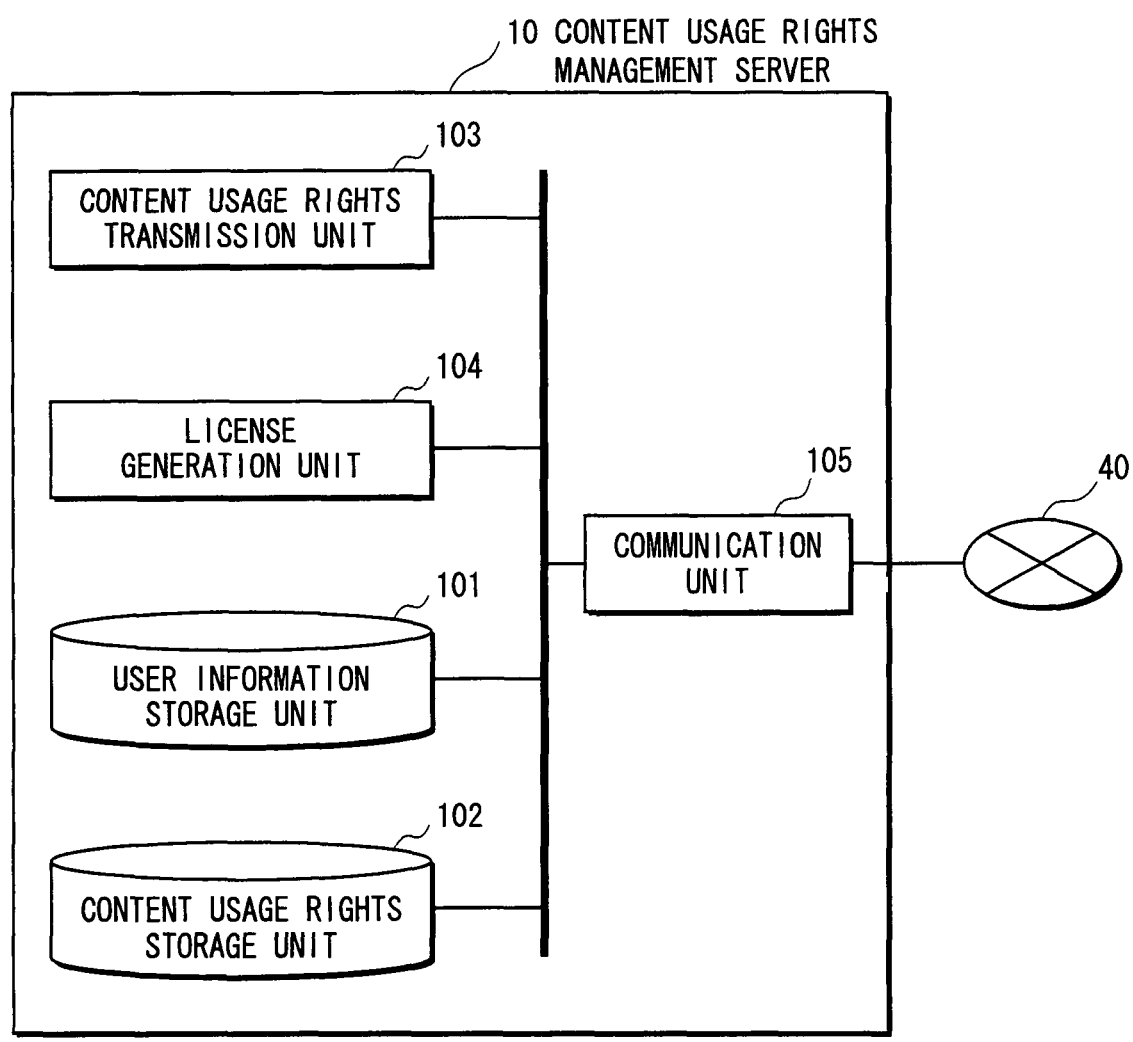
FIG. 3 is a function block diagram showing the structure of a content usage rights management server 10 functionally.

The transmission path 40 is wired or wireless communication path such as the Internet or a CATV (cable television) broadcast wave.
2. Media 30
The media 30 is, for instance, a BD (Blu-ray Disc), and as shown in FIG. 2, stores a plurality of content data 301, ..., 302.
Each content data is composed of a content ID and content in correspondence with each other. More specifically, the content data 301 is composed of a content ID 311 and content 312, the content ID 311 being a numeric value, symbol or the like that uniquely identifies the content 312. Similarly, the content data 302 is composed of a content ID 321 and content 322, the content ID 321 being a numeric value, symbol or the like that uniquely identifies the content 322.
Each content is digital data such as music data, video data, an electronic newspaper, an electronic book, an electronic map, a still image, a game, or computer software. Note that the content is stored in an encrypted state in the media 30.
3. Content Usage Rights Management Server 10
FIG. 3 is a function block diagram showing the structure of the content usage rights management server 10 functionally. As shown in FIG. 3, the contents usage rights management server 10 is composed of a user information storage unit 101, a content usage rights storage unit 102, a content usage rights transmission unit 103, a license generation unit 104, and a communication unit 105.
Specifically, the content usage rights management server 10 is a computer system composed of a microprocessor, a hard disk-unit, a ROM, a RAM, a network connection unit, and so on.
(1) User Information Storage Unit 101
The user information storage unit 101 stores a database of information such as personal information about users, and which user possesses which terminal.
A user information database 110 shown in FIG. 4 is an example of the database stored in the user information storage unit 101. As shown in FIG. 4, the user information database 110 includes user information 111, 112, 113, ..., each user information being composed of a user ID, a terminal ID, a name and payment information.
Here it is assumed that the user information 111 corresponds to the user who possesses the terminal 20 and the media 30. A user ID 114 "0001" is information uniquely identifying the user. A terminal ID 115 "000111" is information uniquely identifying the terminal 20. A terminal ID 116 "001234" is information uniquely identifying a different device to the terminal 20 possessed by the user. A name 117 "AA" is the name of the user. Payment information 118 "00012" is the number of the credit card used by the user to purchase licenses for content.
User information is registered to the user information database 110 when a user performs processing to register as a member with the enterprise. This member registration processing may be performed by the user operating the terminal such that the terminal communicates with an enterprise apparatus via the transmission path 40, by the user posting documents or the like to register as a member, or in another way.
In the member registration processing, the enterprise first allocates a user ID to the user. Then, either by communication via the transmission path 40, by posting documents, or the like, the user informs the enterprise of the terminal ID of his/her terminal, and his/her name and credit card number. User information is generated that is composed of the user ID allocated to the user and the terminal ID, name and credit card number received from the user, and the generated user information is registered in the user information database 110. The user information database 110 shown in FIG. 4 is constructed by performing this member registration processing.

(2) Content Usage Rights Storage Unit 102

The content usage rights storage unit 102 stores therein a database of information about content usage rights held by users.

A content usage rights database 120 shown in FIG. 5 is one example of the database stored in the content usage rights storage unit 102. As shown in FIG. 5, the content usage rights database 120 includes content usage rights information 121, 122, 123, . . . .

Written in each content usage rights information in correspondence are one user ID, and usage rights with respect to each of one or more content held by the user. Each usage rights includes a content ID, a content key, and a usage time limit.

The following describes a specific example.

The content usage rights information 121 of FIG. 5 is composed of a user ID 124 "0001", and two usage rights 125 and 126.

The usage rights 125 are composed of a content ID 131 "111111", a content key 132 "000001", and a usage time limit 133 "unlimited". Meanwhile, the usage rights 126 are composed of a content ID 134 "222221", a content key 135 "000002", and a usage time limit "2004/12/31 12:00".

According to the content usage rights 121, a user identified by the user ID 124 "0001" is able to use, for an "unlimited" period of time, content identified by the content ID 131 "111111" using the content key 132 "000001" as a decryption key. The same user is also able to use, until "2004/12/31 12:00", content identified by the content ID 134 "222221" using the content key 135 "000002" as a decryption key.

Similarly, the content usage rights 122 is composed of a user ID 137 "0002" and usage rights 127, and shows that a user identified by the user ID 137 "0002" is able to use, until "2004/12/31 24:00", content identified by a content ID "222221" using a content key "000002" as a decryption key.

Similarly, the content usage rights 123 is composed of a user ID 138 "0003" and usage rights 128, and shows that a user identified by the user ID 138 "0003" is able to use, until "2004/11/30 12:00", content identified by a content ID "434444" using a content key "033333" as a decryption key.

(3) Content Usage Rights Transmission Unit 103

Upon receiving a request from the terminal, 20 via the transmission path 40 and the communication unit 105, the content usage rights transmission unit 103 replies to the terminal 20 by transmitting thereto a content ID and a usage time limit, as information relating to usage rights held by the user of the terminal 20.

(4) License Generation Unit 104

Upon receiving a license issue request 230 from the terminal 20 via the transmission path 40 and the communication unit 105, the license generation unit 104 generates a license issue request response 140, and transmits the generated license issue request response 140 to the terminal 20. The license issue request 230 is described later.

Figure 6:
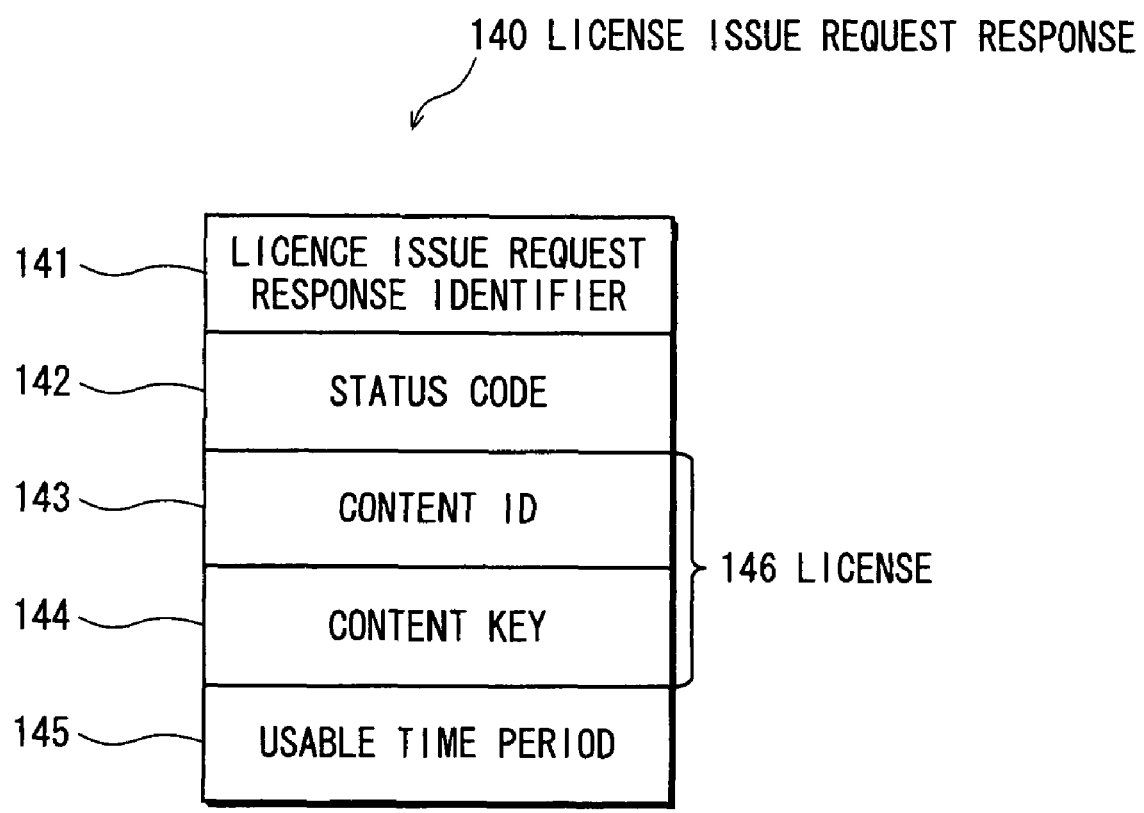
FIG. 6 shows the data structure of a license issue request response 140.

FIG. 6 shows the data structure of the license issue request response 140 generated by the license generation unit 104. As shown in FIG. 6, the license issue request response 140 is composed of a license issue request response identifier 141, a status code 142, a license 146, and a usable time period 145.

Written in the license issue request response identifier 141 is information that the data is a license issue request response. Written in the status code 142 is information showing whether or not issue of a license is possible or not. The license 146 includes a content ID 143 and a content key 144. Here, written in the content ID 143 is a content ID that is identical to the content ID included in the license issue request 230 received from the terminal 20. Written in the content key 144 is key information for decrypting the content identified by the content ID 143. Written in the usable time period 145 is a period of time for which the license 146 is usable. In the present embodiment it is assumed that information showing how many minutes from the time of being issued the license 146 is usable is written in the usable time period 145. Furthermore, in a case in which the license 146 is usable only directly after being issued, the usable time period 145 is omitted. In the case that the usable time period 145 is omitted, the terminal 20 uses the license 146 directly after receiving it, without registering the license 146 in a license database 200 (described later), and then deletes the license 146 directly after using it.

(5) Communication Unit 105

The communication unit 105 is a network communication unit, and performs communication with the terminal 20 via the transmission path 40.

4. Terminal 20

Figure 7:
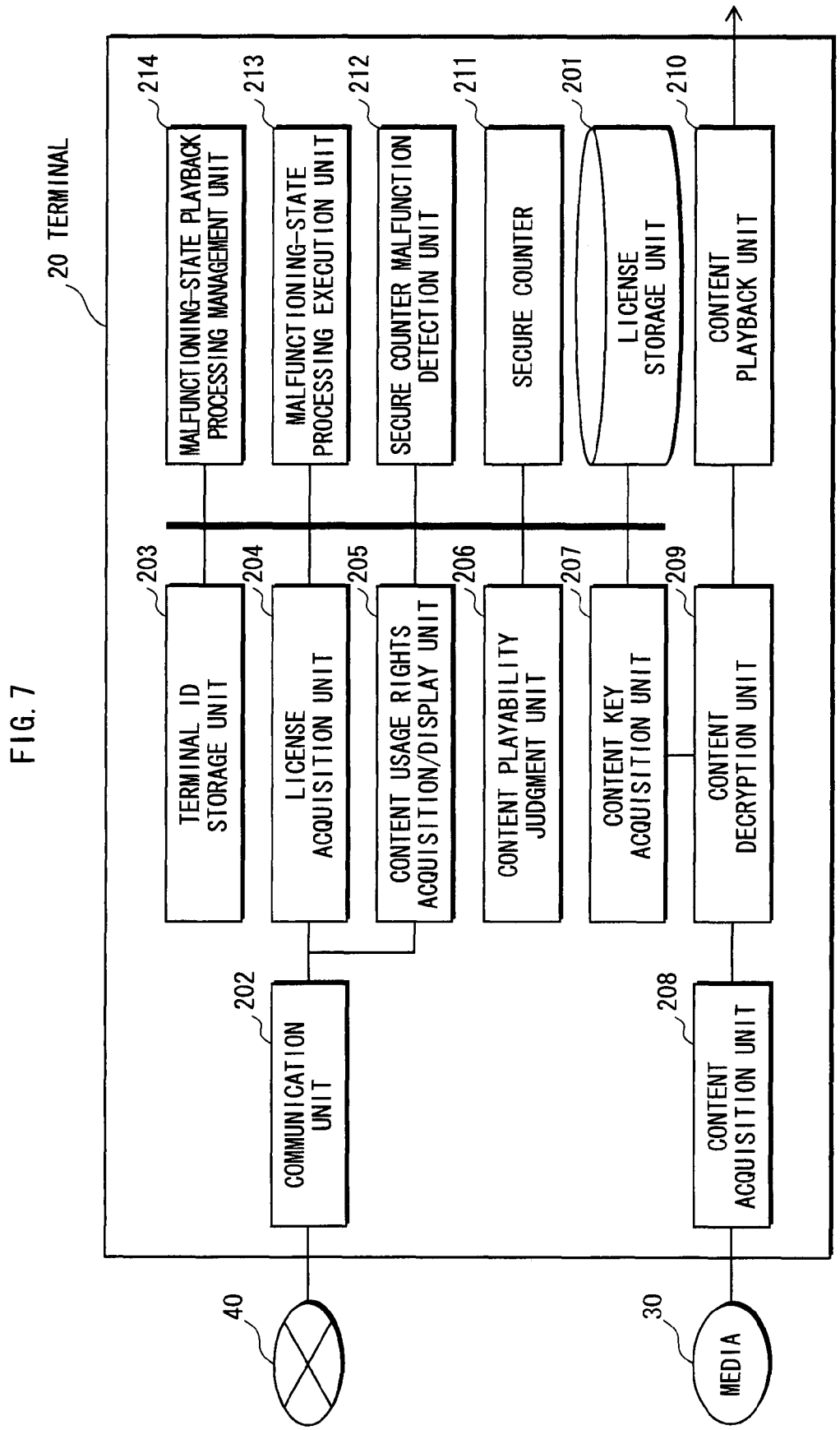
FIG. 7 is a function block diagram showing the structure of a terminal 20 functionally.

FIG. 7 is a function block diagram showing the structure of the terminal 20 functionally. As shown in FIG. 7, the terminal 20 is composed of a license storage unit 201, a communication unit 202, a terminal ID storage unit 203, a license acquisition unit 204, a content usage rights acquisition/display unit 205, a content playability judgment unit 206, a content key acquisition unit 207, a content acquisition unit 208, a content decryption unit 209, a content playback unit 210, a secure counter 211, a secure counter malfunction detection unit 212, a malfunctioning-state processing execution unit 213, and a malfunctioning-state playback processing management unit 214.

Specifically, the terminal 20 is a computer system composed of a microprocessor, a ROM, a RAM, a network connection unit and so on. More specifically, the terminal 20 is assumed to be a BD player in the present embodiment.

(1) License Storage Unit 201

The license storage unit 201 manages a database of licenses issued by the content usage rights management server 10 to the terminal 20.

A license database 220 shown in FIG. 8 is one example of the database stored in the license storage unit 201. As shown in FIG. 8, the license database 220 stores license information 221, 222, 223, . . . .

Each license information is composed of a license, a usability counter upper limit and a usability counter upper limit reliability level, the license being composed of a content ID and a content key.

As a specific example, the license information 221 is composed of a license 228, a usability counter upper limit 226 "unrestricted", and a usability counter upper limit reliability level "reliable". The license 228 is composed of a content ID 224 "111111" and a content key 225 "000001".

The usability counter upper limit is information showing what value the secure counter 211 (described later) must reach for a license to become unusable. Since the usability counter upper limit 226 is "unrestricted", the license 228 is usable regardless of the value of the secure counter 211.

The usability counter upper limit reliability level is information showing whether or not the value of the corresponding usability counter upper limit is reliable. The usability counter upper limit reliability level is normally set to "reliable" as is the usability counter upper limit reliability level 227, but is rewritten to "unreliable" when a malfunction, such as a power cut, occurs in the secure counter 211.

(2) Communication Unit 202

The communication unit 202 is a network communication unit, and performs communication with the content usage rights management server 10 via the transmission path 40.

(3) Terminal ID Storage Unit 203

The terminal ID storage unit 203 stores a terminal ID "000111" that uniquely identifies the terminal 20. Note that "000111" is simply one example, and as other examples the terminal ID may be a numeric value, a mixture of a numeric value and a symbol or the like, or a manufacturing number assigned to the terminal when manufactured.

(4) License Acquisition Unit 204

The license acquisition unit 204 has a function of acquiring a license from the content usage rights management server 10. More specifically, the license acquisition unit 204 acquires a license from the content usage rights management server 10 by generating the license issue request 230 shown in FIG. 9, and transmitting the generated license issue request 230 to the content usage rights management server 10 via the transmission path 40.

Figure 9:
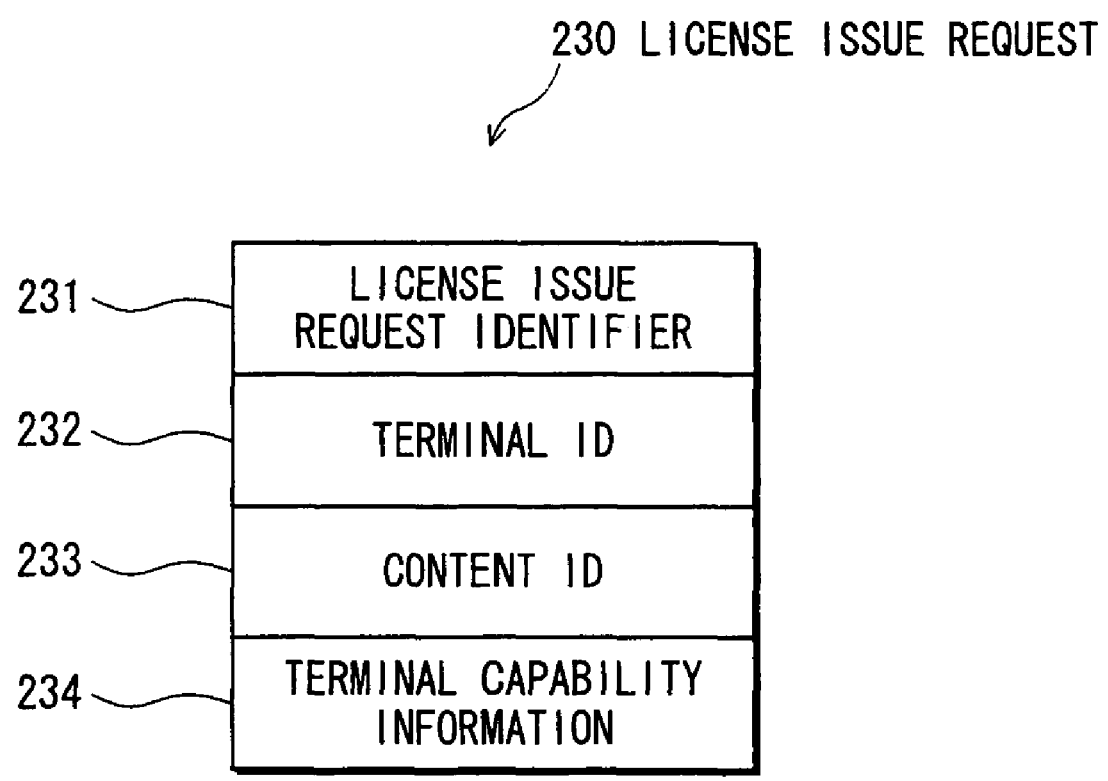
FIG. 9 shows the data structure of a license issue request 230.

FIG. 9 shows the data structure of the license issue request 230. As shown in FIG. 9, the license issue request 230 is composed of a license issue request identifier 231, a terminal ID 232, a content ID 233, and terminal capability information 234.

Written in the license issue request identifier 231 is information showing that the data is a license issue request. Written in the terminal ID 232 is the terminal ID of the terminal itself, which is stored in the terminal ID storage unit 203. Written in the content ID 223 is a content ID that identifies the content for which a license is attempting to be acquired. Written in the terminal capability information 234 is information relating to the capability of the terminal 20. In the present embodiment, the terminal capability information 234 shows whether or not the terminal 20 has a secure counter.

(5) Content Usage Rights Acquisition/Display Unit 205

The content usage rights acquisition/display unit 205 makes a request to the content usage rights management server 10 to transmit information relating to the content usage rights held by the user of the terminal 20, and acquires information relating to usage rights of content that the user is able to use. Here, the information relating to content usage rights is a set of information consisting of a content ID and a usage time limit. According to this information relating to usage rights, the terminal is able to know which content it is able to play, and the usage time limit of the playable content.

The content usage rights acquisition/display unit 205 also has the playable content and the usage time limit thereof displayed on a display or the like (not illustrated). This enables the user to know which content is able to be played, and the usage time limit thereof.

Note that the content usage rights acquisition/display unit 205 has a function of storing the information relating to content usage rights acquired from the content usage rights management server 10 for a predetermined amount of time. This enables to terminal 20 to inform the user of the usable content and the usage time limit thereof using the stored data, even if the terminal 20 is unable to communicate with the content usage rights management server 10 due to a network failure or the like.

(6) Content Playability Judgment Unit 206

Figure 17:
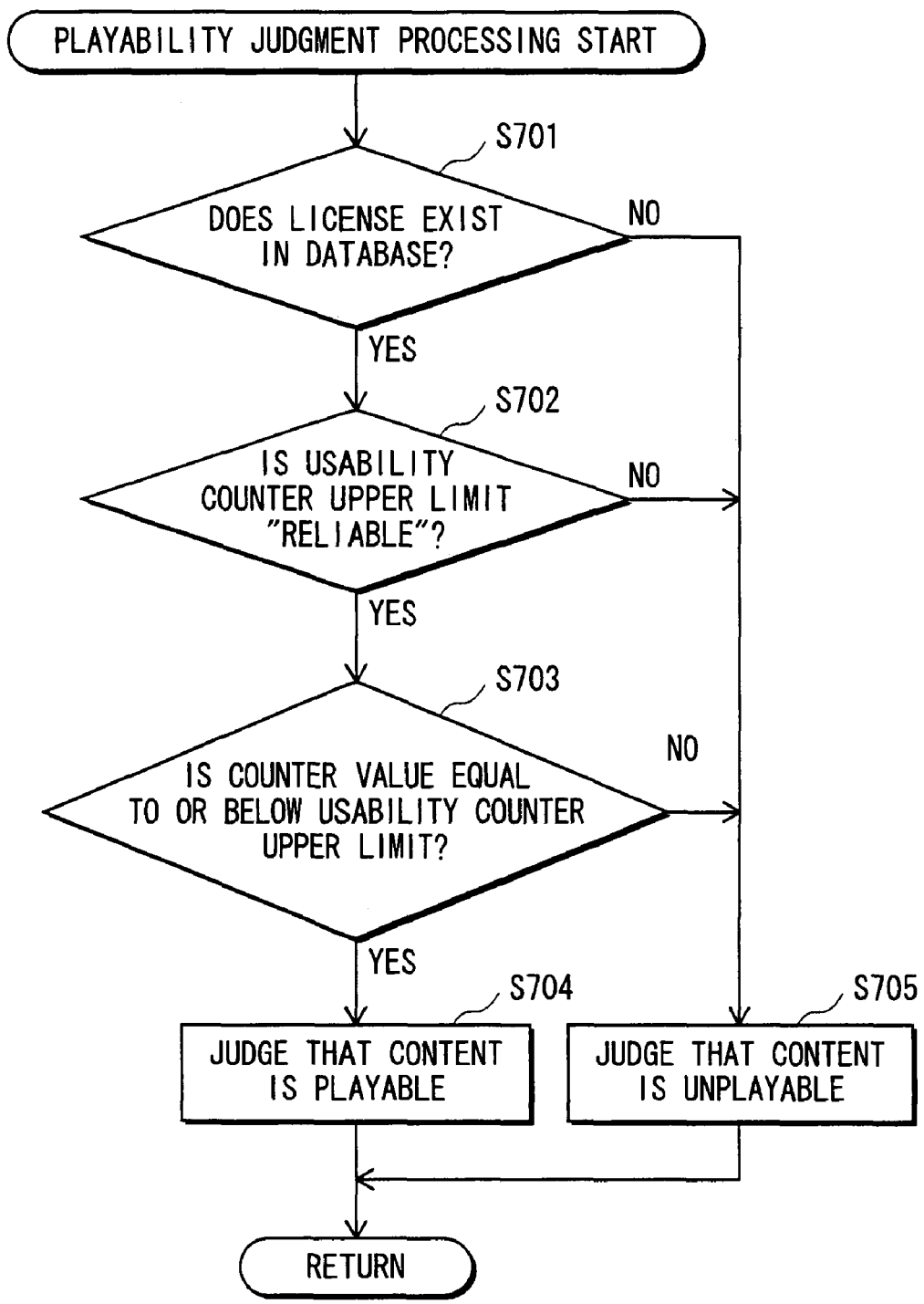
FIG. 17 is a flowchart showing operations for playability judgment processing.

The content playability judgment unit 206 performs playability judgment processing shown in FIG. 17 when a content playback instruction is received from the user. The content playability judgment unit 206 also performs malfunctioning-state playability judgment processing shown in FIG. 18.

Details of the playability judgment processing and the malfunctioning-state playability judgment processing performed by the content playability judgment unit 206 are given later.

(7) Content Key Acquisition Unit 207

In content playback processing, the content key acquisition unit 207 acquires the content key from the license storage unit 201, and transfers the acquired content key to the content decryption unit 209.

(8) Content Acquisition Unit 208

In content playback processing, the content acquisition unit 208 reads encrypted content from the media 30, and transfers the read encrypted content to the content decryption unit 209.

(9) Content Decryption Unit 209

The content decryption unit 209 receives encrypted content from the content acquisition unit 208, and receives a content key from the content key acquisition unit 207. The content decryption unit 209 subjects the encrypted content to a decryption algorithm D using the content key as a decryption key, to generate decrypted content, and transfers the decrypted content to the content playback unit 210. Note that the decryption algorithm D is an algorithm for converting to plaintext a ciphertext obtained by encrypting using an encryption algorithm E.

(10) Content Playback Unit 210

The content playback unit 210 receives content from the content decryption unit 209, and plays the received content.

Specifically, the content playback unit 210 is composed of a video decoder, an audio decoder, a buffer, and so on. The content playback unit 210 separates the content received from the content decryption unit 209 into video data and audio data, and decodes the video data in the video decoder and the audio data in the audio decoder, to generate a video signal and an audio signal. The content playback unit 210 then outputs the generated video signal to a display, and the generated audio signal to a speaker. Note that the display and speaker are not illustrated.

(11) Secure Counter 211

The secure counter 211 stores a counter value to which it adds "1" every predetermined unit of time. In the present embodiment, "1" is added to the counter value every one minute. The secure counter 211 is tamper-resistant, and the counter value cannot be modified, nor can the rate at which the counter value is added to be increased or reduced. Note that the method used to make the secure counter 211 tamper-resistant is not limited to any particular method.

Furthermore, the secure counter 211 has a structure for writing the counter value to a non-volatile memory every predetermined unit of time.

(12) Secure Counter Malfunction Detection Unit 212

The secure counter malfunction detection unit 212 detects that a malfunction has occurred in the secure counter 211 when a power cut or like causes the counter value of the secure counter 211 to be temporarily stopped or to be reset. Note that the method used to detect a malfunction is not limited to any particular method.

The secure counter malfunction detection unit 212 also has structure for detecting that the secure counter 211 has been restored from a malfunctioning state.

(13) Malfunctioning-State Processing Execution Unit 213

The malfunctioning-state processing execution unit 213 changes the usability counter upper limit reliability level included in the license database 220 managed by the license storage unit 201, as necessary when the secure counter malfunction detection unit 212 detects a malfunction in the secure counter 211. Detailed processing is described later with reference to the flowchart in FIG. 11.

(14) Malfunctioning-State Playback Processing Management Unit 214

The malfunctioning-state playback processing management unit 214 stores in advance malfunctioning-state playback conditions 250 shown in FIG. 10A.

When the counter value of the secure counter 211 is in an unreliable state due to a power cut or the like, the terminal 20 is able to play content within a range specified by the malfunctioning-state playback conditions 250, even when a malfunction has occurred and, due to a network failure or some other reason, the terminal 20 is unable to communicate with the content usage rights management server 10 and is unable to acquire the license necessary to play the content.

As shown in FIG. 10, the malfunctioning-state playback conditions 250 include a malfunctioning-state playback permitted count 251 "10", a malfunctioning-state, playback permitted time 252 "30 hours", a malfunctioning-state playback permitted content count 253 "5", and a malfunctioning-state playback permitted elapsed time 254 "24 hours".

The malfunctioning-state playback permitted count 251 shows that, even if a malfunction occurs, content is permitted to be played as long as the number of times content playback is performed does not exceed ten. The malfunctioning-state playback, permitted time 252 shows that content is permitted to be played when a malfunction occurs as long as the total playback time does not exceed 30 hours. The malfunctioning-state playback permitted content count 253 shows that content is permitted to be played when a malfunction occurs as long as the number contents played does not exceed five. The malfunctioning-state playback permitted elapsed time 254 shows that playback is permitted as long as no more than 24 hours have elapsed since the malfunction in the secure counter 211 was detected.

Even if a malfunction occurs, the terminal 20 is able to perform playback if all of the above conditions are met.

The malfunctioning-state playback processing management unit 214 also manages malfunctioning-state playback history showing a history of playback of content during a malfunctioning state. More specifically, as the malfunctioning-state playback history, the malfunctioning-state playback processing management unit 214 manages a total playback count, total playback time and playback content count, and one or more content IDs of content that has been played during a malfunctioning state. The malfunctioning-state playback management unit 214 updates the data in the malfunctioning-state playback history information each time content is played during a malfunctioning state.

FIG. 10B shows one example of the malfunctioning-state playback history. As shown in FIG. 10B, malfunctioning-state playback history 260 includes a malfunctioning-state playback count 261 "4", and malfunctioning-state playback time 262 "4 hrs 30 mins", a malfunctioning-state playback content count 263 "2", a played content ID 264 "111111", and a played content ID 265 "222221".

According to the malfunctioning-state playback history 260, up to the present point in time, the terminal 20 has played content four times in a malfunctioning state, the total playback time of the four times is 4 hours 30 minutes, the total number of contents played in the four times is two, and the content IDs of the two contents are 111111 and 222221.

Note that when it is judged by the content playability judgment unit 206 that content is to be played during a malfunctioning state, the malfunctioning-state playback management unit 214 acquires the content ID of the content that is to be played from the content playability judgment unit 206.

When the content ID of the acquired content is not included in the played content IDs, the malfunctioning-state playback management unit 214 adds "1" to the malfunctioning-state playback content count stored at that time, and stores, as a played content ID, the content ID acquired from the content playability judgment unit 206.

The malfunctioning-state playback processing management unit 214 also manages a malfunction elapsed time 270 shown in FIG. 10C. The malfunction elapsed time 270 is the time elapsed from a point in time at which a malfunction was detected in the secure counter 211. Measurement of the malfunction elapsed time 270 commences according to an instruction from the secure counter malfunction detection unit 212. Here, the value of the malfunction elapsed time 270 is written to a non-volatile memory every predetermined unit of time. This prevents the malfunction elapsed time 270 being reset and measured from "0" again if a malfunction occurs for a reason such as the power being cut again after measurement of the malfunction elapsed time 270 has commenced.

<Operations>

The following describes operations of the content playback system 1 with used of the flowcharts shown in FIG. 11 to FIG. 19.

1. Malfunctioning-State Processing

Figure 11:
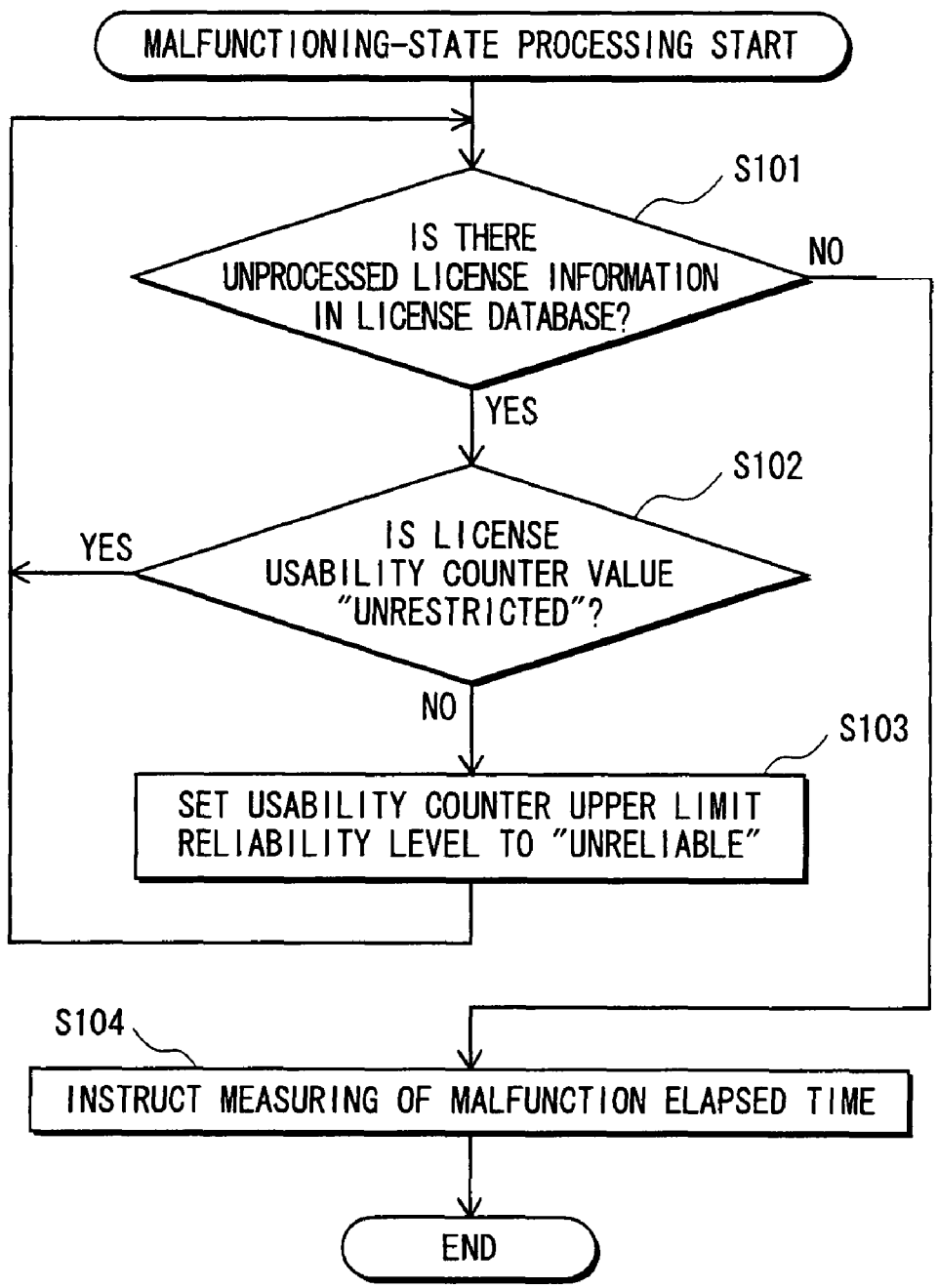
FIG. 11 is a flowchart showing operations for malfunctioning-state processing.

The flowchart in FIG. 11 shows operations for processing executed by the malfunctioning-state processing execution unit 213 when the secure counter malfunction detection unit 212 detects a malfunction in the secure counter 211.

The malfunctioning-state processing execution unit 213 refers to the license database 220 to check if any license information exists that has not been subjected to malfunctioning-state processing (step S101).

When unprocessed license information exists in the license database 220 (YES at step S101), the malfunctioning-state processing execution unit 213 targets one license information, and checks whether or not the usability counter upper limit included in the targeted license information is "unrestricted" (step S102).

When the usability counter upper limit is "unrestricted" (YES at step S102), the malfunctioning-state processing execution unit 213 returns to the processing at step S101. When the usability counter upper limit is not "unrestricted" (NO at step S102), the malfunctioning-state processing execution unit 213 sets the usability counter upper limit reliability level included in the targeted license information to "unreliable" (step S103), and then returns to step S101.

At step S101, when no unprocessed license information exists in the license database 220 (NO at step S101), the malfunctioning-state processing execution unit 213 instructs the malfunction playback processing management unit 214 to measure malfunction elapsed time (step S104), and ends the processing.

2. License Acquisition Processing

Figure 12:
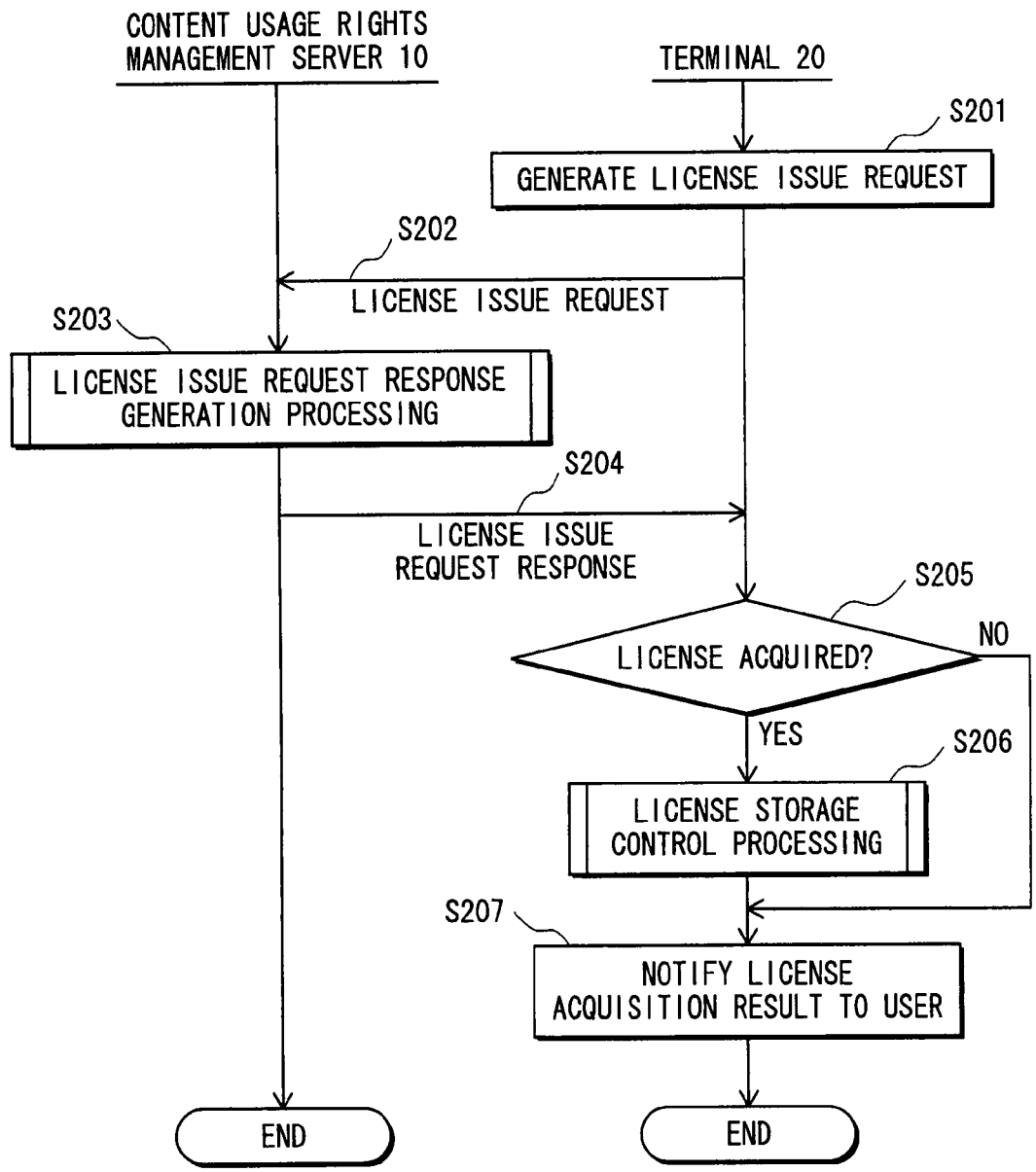
FIG. 12 is a flowchart showing operations for license acquisition processing.

FIG. 12 is a flowchart showing operations for license acquisition processing in the content usage rights management server 10 and the terminal 20.

First, the license acquisition unit 204 of the terminal 20 generates the license issue request 230 shown in FIG. 9 (step S201). The communication unit 202 transmits the license issue request 230 to the content usage rights management server 10 via the transmission path 40, and the communication unit 105 of the content usage rights management server 10 receives the license issue request 230 (step S202).

The license generation unit 104 of the content usage rights management server 10 performs license issue request response generation processing (step S203), and generates the license issue request response 140 shown in FIG. 6. The communication unit 105 transmits the license issue request response 140 generated at step S203 to the terminal 20 via the transmission path 40, and the communication unit 202 of the terminal 20 receives the license issue request response 140 (step S204).

The license acquisition unit 204 refers to the status code 142 in the received license issue request response 140 to determine whether or not the license was acquired (step S205). If the license was not acquired (NO at step S205), the license acquisition unit 204 proceeds to step S207. When the license was acquired (YES at step S205), the license acquisition unit 204 performs license storage control processing (step S206), and judges whether or not to store the license in the license database 220. When it is judged that the license is to be stored, the license acquisition unit 204 stores the license in the license database 220.

Next, the license acquisition unit 204 generates information showing a license acquisition result, and informs the user of the license acquisition result by, for instance, having the generated information displayed on a display (step S207).

3. License Issue Request Response Generation Processing

Figure 13:
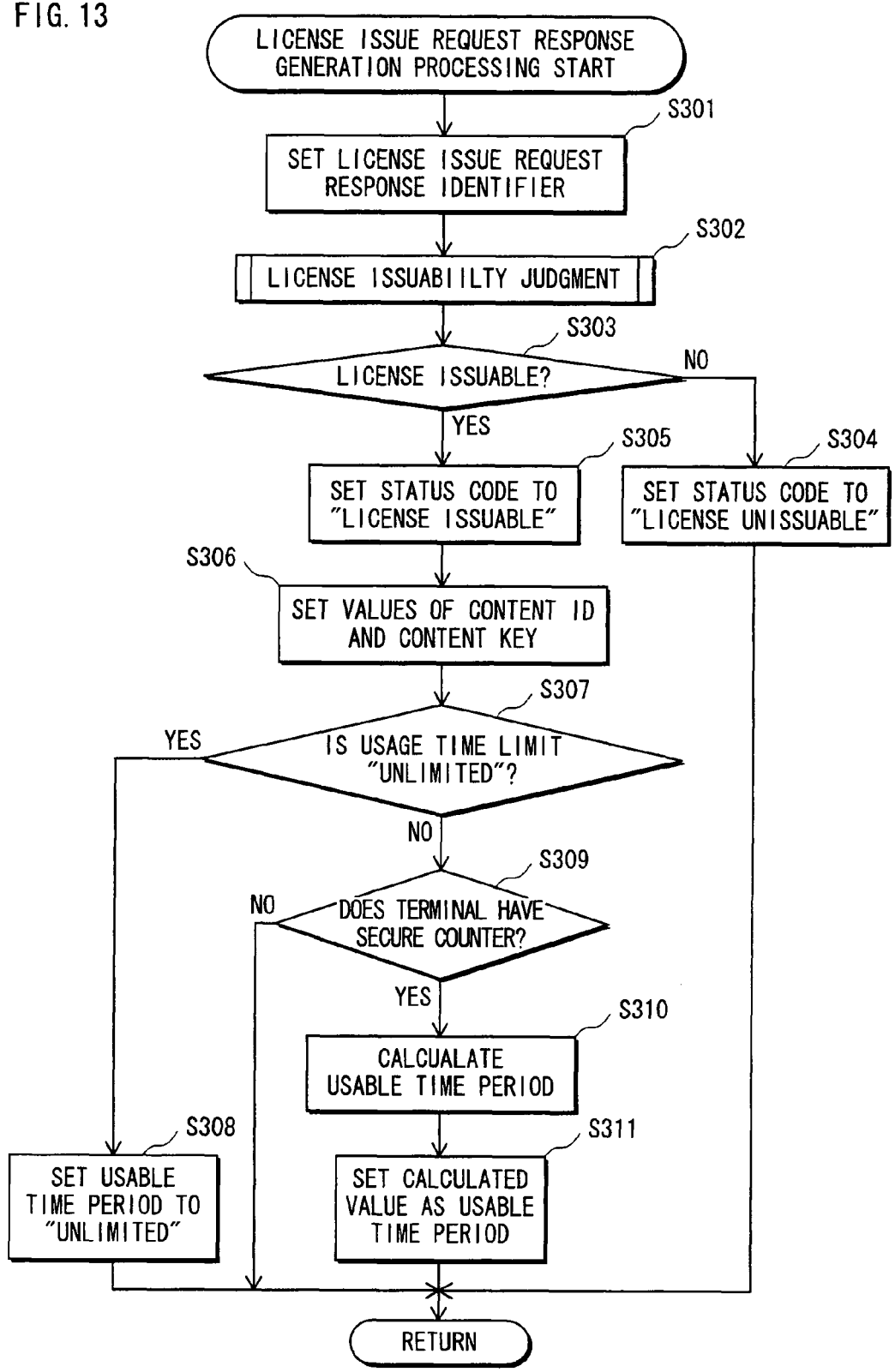
FIG. 13 is a flowchart showing operations for license issue request response generation processing.

FIG. 13 is a flowchart showing operations for license issue request response generation processing by the license generation unit 104 of the content usage rights management server 10. Note that the operations shown here are the details of step S203 of FIG. 12.

The license generation unit 104 sets a predetermined value in the license issue request response identifier 141 in the generated license issue request response 140 (step S301), and then designates usage rights based on the content usage rights database 120, and performs license issuability judgment processing (step S302).

When as a result of the license issuability judgment processing it is judged that a license is unable to be issued (NO at step S303), the license generation unit 104 sets the status code 142 to "license unissuable" (step S304), and returns to the start of the processing.

When as a result of the license issuability judgment processing it is judged that a license is able to be issued (YES at step S303), the license generation unit 104 sets the status code 142 to "license issuable" (step S305).

The license generation unit 104 refers to the content usage rights database 120, and sets the respective values of the content ID 143 and the content key 144 of the license issue request response 140 being generated (step S306). For instance, if the usage rights 125 are designated at step S302, the license generation unit 104 sets the content ID 143 to "111111" and the content key 144 to "000001".

The license generation unit 104 refers to the content usage rights database 120 to check whether or not the usage time limit in the usage rights specified at step S302 is "unlimited" (step S307). When the usage time limit is "unlimited" (YES at step S307), the license generation unit 104 sets the usable time period 145 in the license issue request response 140 being generated to "unlimited" (step S308). The license generation unit 104 then ends the license issue request generation processing and returns to the start.

When the usage time limit is not "unlimited" (NO at step S307), the license generation unit 104 refers to the terminal capability information 234 included in the license issue request 230 received from the terminal 20 at step S202 (FIG. 12), to check whether or not the terminal 20 has a secure counter (step S309). When the terminal 20 does not have a secure counter (NO at step S309), the license generation unit 104 ends the license issue request response generation processing, and returns to the start. Note that the usable time period 145 does not exist in the license issue request response 140 generated here.

When the terminal 20 has a secure counter (YES at step S309), the license generation unit 104 calculates a usable time period based on the current date and time and the usage time limit in the usage rights designated at step S302 (step S310). Note that the usable time period is calculated by calculating the length of time from the current date and time to the date and time set in the usage time limit. If, for instance, the usage time limit is "2004/8/6 12:00" and the current date and time is "2004/8/6 10:00", the usable time period is calculated to be "120 minutes".

The license generation unit 104 sets the usable time period 145 in the license issue request response 140 to the value calculated at S310 (step S311), and then ends the license issue request response processing and returns to the start.

4. License Issuablility Judgment Processing

Figure 14:
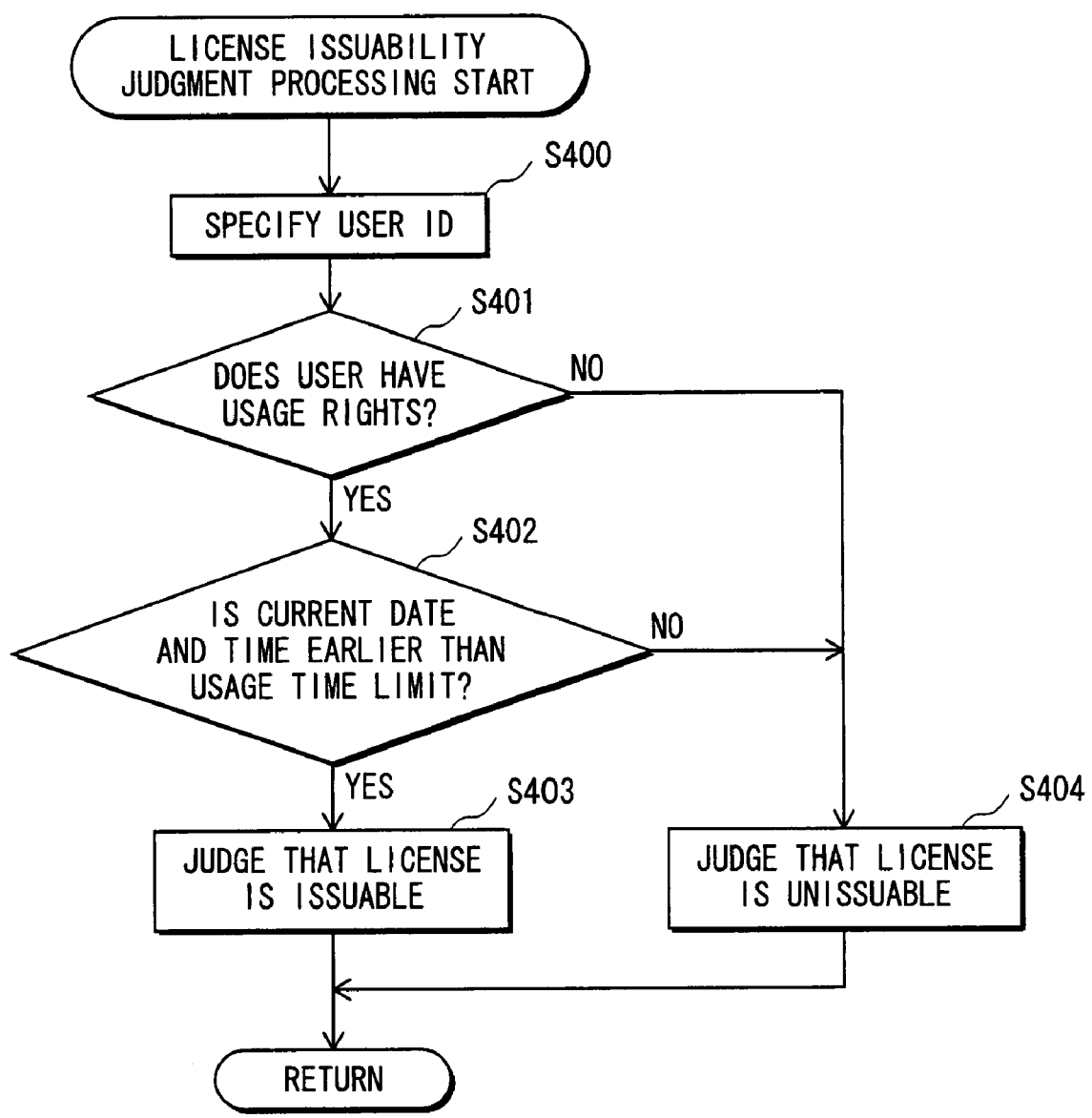
FIG. 14 is a flowchart showing operations for license issuability determination processing.

FIG. 14 is a flowchart showing operations for license issuability judgment processing performed by the license generation unit 104 of the content usage rights management server 10. Note that the operations shown here are the details of step S302 in FIG. 13.

The license generation unit 104 refers to the user information database 110, based on the terminal ID 232 included in the license issue request 230 received from the terminal 20 at step S202 (FIG. 12), to specify the user ID of the user requesting a license to be issued (step S400). For instance, if the terminal ID 232 is "000111", based on the user information 111, the license generation unit 104 knows that the corresponding user ID is "0001".

Next, the license generation unit 104 judges whether or not the user requesting issue of a license has usage rights for the corresponding content (step S401). More specifically, by referring to the content usage rights database 120, the license generation unit 104 checks whether or not rights information exists in correspondence with the user ID designated at step S400, and if such rights information exists, whether or not said rights information includes the content ID set in the content ID 233. When rights information exists that includes the content ID set in the content ID 233, it is judged that the user has usage rights for the content.

In the case of the user ID being designated as "0001" at step S400 and the content ID 233 in the license issue request 230 being "111111", it is known that the user has usage rights for the content because, as shown in FIG. 5, the content usage rights 121 stores, in correspondence with the user ID 124 "0001", usage rights 125 that include a content ID 131 "111111".

The license generation unit 104 designates the rights information including the content ID set in the content ID 233 as the rights information to be used in generating the license issue request response 140.

When it is judged that the user does not have the usage rights at step S401 (NO at step S401), the license generation unit 104 proceeds to step S404. When it is judged that the user has the usage rights at step S401 (YES at step S401), the license generation unit 104 refers to the rights information designated at step S401, to judge whether or not the current date and time are earlier than the usage time limit included in the designated rights information (step S402).

When the current date and time are earlier than the usage time limit (YES at step S402), the license generation unit 104 judges that a license is issuable (step S403). When the current date and time are not earlier than the usage time limit (NO at step S402), the license generation unit 104 judges that a license is not issuable (step S404).

5. Operations for License Storage Control Processing

Figure 15:
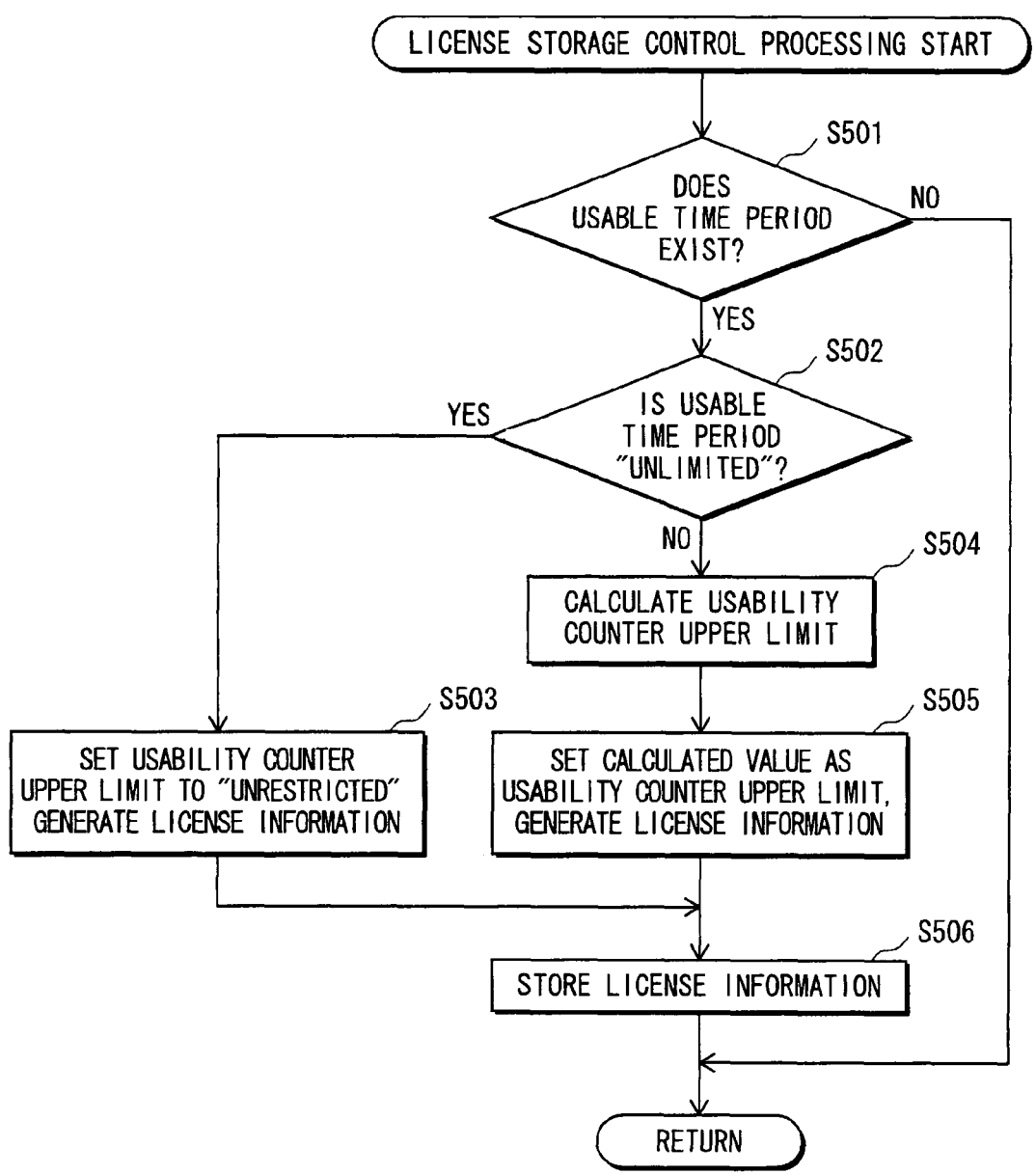
FIG. 15 is a flowchart showing operations for license storage control processing.

FIG. 15 is a flowchart showing operations for license storage control processing in the license acquisition unit 204 of the terminal 20. Note that the operations described here are the details of step S206 of FIG. 12.

The license acquisition unit 204 checks whether or not the usable time period 145 exists in the license issue request response 140 (step S501). When the usable time period 145 does not exist (NO at step S501), the license acquisition unit 204 ends the license storage control processing without storing the license 146 in the license database 220. When the usable time period 145 exists (YES at step S501), the license acquisition unit 204 checks whether or not the usable time period 145 in the license issue request response 140 is "unlimited" (step S502).

When the usable time period 145 is "unlimited" (YES at step S502), the license acquisition unit 204 generates license information composed of: the content ID set in the content ID 143 of the license 146; the content key set in the content key 144 in the license 146; a usability counter upper limit set to "unrestricted"; and a usability counter upper limit reliability level set to "reliable" (step S503). The license acquisition unit 204 then stores the generated license information in the license database 220 (step S506).

When the usable time period 145 is not "unlimited" (NO at step S502), the license acquisition unit 204 acquires the current counter value from the secure counter 211, and calculates the usage counter upper limit from the acquired counter value and the usable time period in the license issue request response 140 received at step S204 (step S504).

The usability counter upper limit is calculated by adding a counter value equivalent to the amount of time set in the usable time period 145, to the counter value of the secure counter 211. For instance, in the case that the usable time period 145 is "120 minutes", and the current counter value of the secure counter 211 is "000100", the usability counter upper limit is calculated to be "000220".

The license acquisition unit 204 generates license information composed of: the content ID set in the content ID 143 of the license 146; the content key set in the content key 144 in the license 146, the usability counter upper limit calculated at step S504; and a usability counter upper limit reliability level set to "reliable" (step S505). The license acquisition unit 204 stores the generated license information in the license database 220 (step S506).

6. Content Playback Processing

Figure 16:
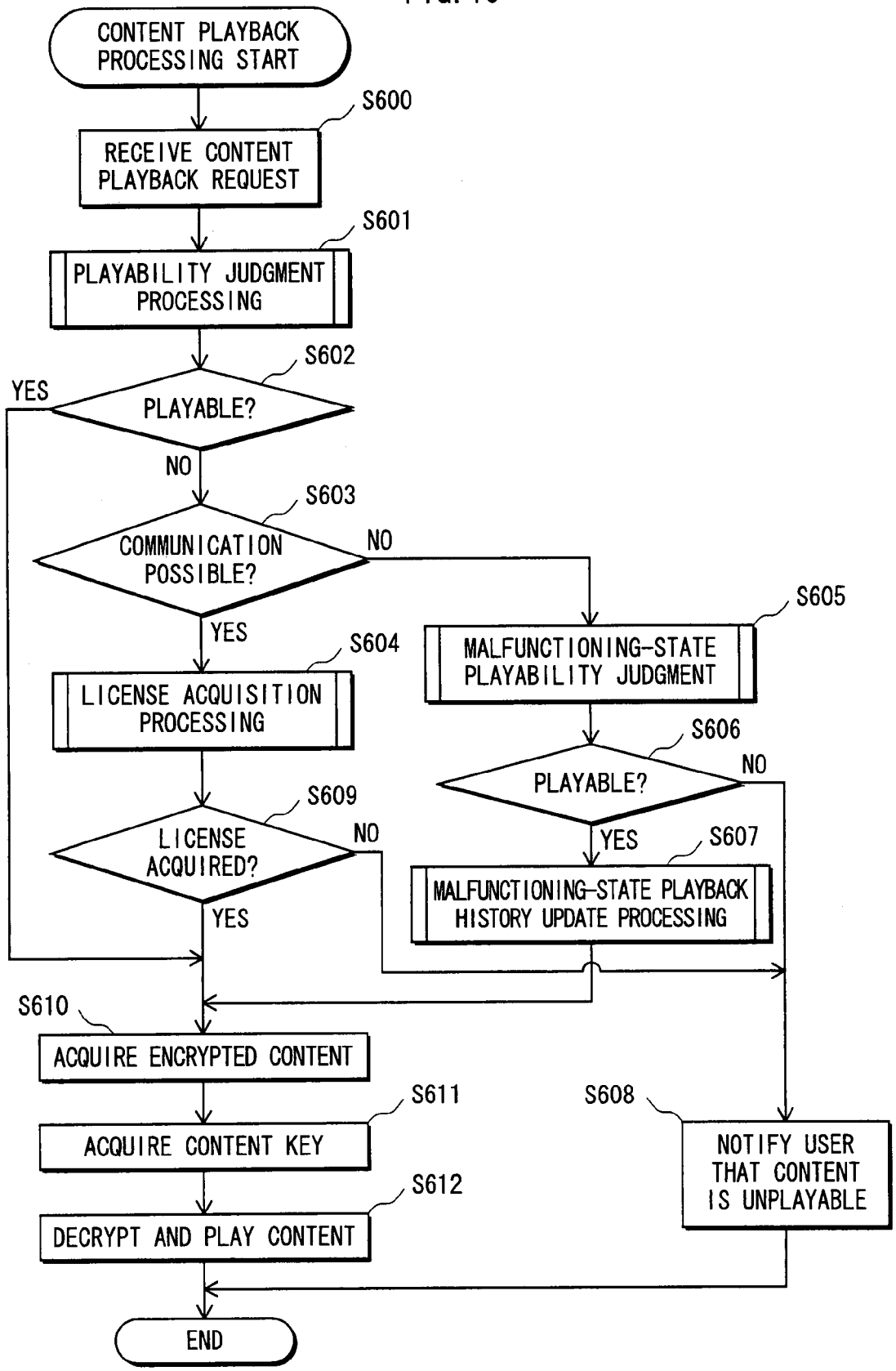
FIG. 16 is a flowchart showing operations for content playback processing.

FIG. 16 is a flowchart showing operations for content playback processing by the terminal 20.

First, the terminal 20 receives input of a request to play content from the user (step S600). It is assumed that the input of the request to play content includes a content ID identifying the content of which the user is requesting playback.

Next, the content playability judgment unit 206 performs playability judgment processing (step S601). When as a result of the judgment at step S601, playback of the content is possible (YES at step S602), the content playability judgment unit 206 proceeds to step S610. When as a result of the judgment at step S601, playback of the content is not possible (NO at step S602), the communication unit 202 checks whether or not communication with the content usage rights server 10 via the transmission path 40 is possible (step S603).

When, due to a network failure or the like, communication is not possible (NO at step S603), the content playability judgment unit 206 executes malfunctioning-state playability judgment processing (step S605). When as a result of the processing at step S605 playback is judged to be possible (YES at step S606), the malfunctioning-state playback processing management unit 214 performs malfunctioning-state playback history update processing (step S607), and then proceeds to step S610.

When as a result of the processing at step S605 playback is judged not to be possible (NO at step S606), the content playability judgment unit 206 generates information showing that playback of the content is not possible, and informs the user that playback is not possible, by for instance, displaying the generated information on a display (step S608).

When communication is possible (YES at step S603), the license acquisition unit 204 performs the license acquisition processing shown in FIG. 12 (step S604). The license acquisition unit 204 checks whether or not a license has been acquired (step S609), and when a license has not been acquired (NO at step S609), proceeds to step S608 and informs the user that playback is not possible.

When a license has been acquired (YES at step S609), the content acquisition unit 208 acquires the content identified by the content ID received at step S600 (step S610). Note that the content acquired here is content in an encrypted state as described earlier.

Next, the content key acquisition unit 207 acquires the content key corresponding to the content ID received at step S600 (step S611). The content decryption unit 209 subjects the encrypted content acquired at step S610 to the decryption algorithm D using the content key acquired at step S611 as a decryption key. The content playback unit 210 then plays the decrypted content (step S612).

7. Playability Judgment Processing

FIG. 17 is a flowchart showing operations for playability judgment processing by the content playability judgment unit 206. Note that the operations shown here are the details of step S601 in FIG. 16.

The content playability judgment unit 206 checks whether or not the license that includes the content ID received at step S600 exists in the license database 220-(step S701). When the license does not exist (NO at step S701), the content playability judgment unit 206 proceeds to step S705.

When the license exists in the license database 220 (YES at step S701), the content playability judgment unit 206 reads the usability counter upper limit reliability level in correspondence with the license, and judges whether or not the value of the usability counter upper limit is reliable (step S702). When the value of the usability counter upper limit is unreliable (NO at step S702), the content playability judgment unit 206 proceeds to step S705.

When the value of the usability counter upper limit is reliable (YES at step S702), the content playability judgment unit 206 reads the counter value from the secure counter 211, and further reads the usability counter upper limit in correspondence with the license. The content playability judgment unit 206 judges whether or not the counter value read from the secure counter 211 is equal to or less than the usability counter upper limit value (step S703).

When the counter value is equal to or less than the usability counter upper limit value (YES at step S703), the content playability judgment unit 206 judges that playback of the content of which the user is requesting playback is possible (step S704).

When the counter value is not equal to or less than the usability counter upper limit value (NO at step S703), the content playability judgment unit 206 judges that playback of the content of which the user is requesting playback is not possible (step S705).

8. Malfunctioning-State Playability Judgment Processing

Figure 18:
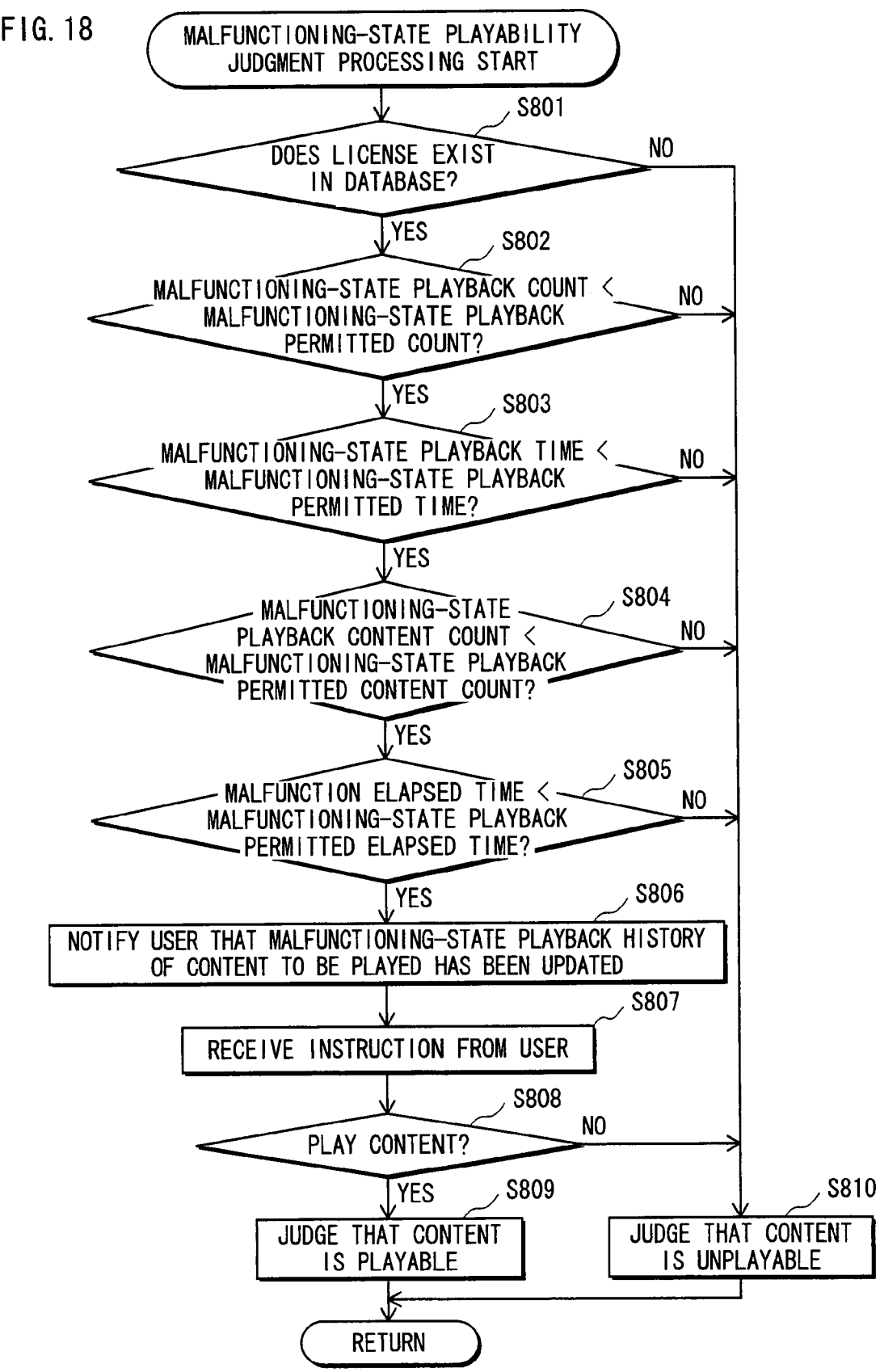
FIG. 18 is a flowchart showing operations for malfunctioning-state playability judgment processing.

FIG. 18 is a flowchart showing operations for malfunctioning-state playability judgment processing by the content playability judgment unit 206. Note that operations described here are the details of step S605 in FIG. 16.

The malfunctioning-state playability judgment unit 206 checks whether or not a license that includes the content ID received at step S600 exists in the license database 220 (step S801). When such a license does not exist (NO at step S801), the malfunctioning-state playability judgment unit 206 proceeds to step S810. When such a license exists (YES at step S801), the malfunctioning-state playability judgment unit 206 reads the malfunctioning-state playback permitted count and the malfunctioning-state playback count stored by the malfunctioning-state playback processing management unit 214.

The content playability judgment unit 206 judges whether or not the malfunctioning-state playback count is less than the malfunctioning-state playback permitted count (step S802), and when the malfunctioning-state playback count is not less than the malfunctioning-state playback permitted count (NO at step S802), proceeds to step S810. When the malfunctioning-state playback count is less than the malfunctioning-state playback permitted count (YES at step S802), the content playability judgment unit 206 reads the malfunctioning-state playback permitted time and the malfunctioning-state playback time stored by the malfunctioning-state playback processing management unit 214.

The content playability judgment unit 206 judges whether or not the malfunctioning-state playback time is less than the malfunctioning-state playback permitted time (step S803), and when the malfunctioning-state playback time is not less than the malfunctioning-state playback permitted time (NO at step S803), proceeds to step S810. When the malfunctioning-state playback time is less than the malfunctioning-state playback permitted time (YES at step S803), the content playability judgment unit 206 reads the malfunctioning-state playback permitted content count and the malfunctioning-state playback content count stored by the malfunctioning-state playback processing management unit 214.

The content playability judgment unit 206 judges whether or not the malfunctioning-state playback content count is less than the malfunctioning-state playback permitted content count (step S804), and when the malfunctioning-state playback content count is not less than the malfunctioning-state playback permitted content count (NO at step S804), proceeds to step S810. When the malfunctioning-state playback content count is less than the malfunctioning-state playback permitted content count (YES at step S804), the content playability judgment unit 206 reads the malfunctioning-state playback permitted elapsed time and the malfunctioning-state playback elapsed time stored by the malfunctioning-state playback processing management unit 214.

The content playability judgment unit 206 judges whether or not the malfunctioning-state playback elapsed time is less than the malfunctioning-state playback permitted elapsed time (step S805), and when the malfunctioning-state playback elapsed time is not less than the malfunctioning-state playback permitted elapsed time (NO at step S805), proceeds to step S810. When the malfunctioning-state playback elapsed time is less than the malfunctioning-state playback permitted elapsed time (YES at step S805), the content playability judgment unit 206 informs the user that the malfunctioning-state playback history will be updated if the requested content will be played (step S806). More specifically, the content playability judgment unit 206 generates information indicating that the malfunctioning-state playback history will be updated if the content is played, and informs the user by, for instance, displaying the generated information on a display.

The content playability judgment unit 206 receives an instruction showing whether or not to play the content from the user (step S807). When the instruction received from the user shows that the content is to be played (YES at step S808), the content playability judgment unit 206 judges that the content of which playback is requested by the user is playable (step S809). When the instruction received from the user shows that the content is not to be played (NO at step S808), the content playability judgment unit 206 judges that the content of which playback is requested by the user is not playable (step S810).

9. Malfunctioning-State Playback History Update Processing

Figure 19:
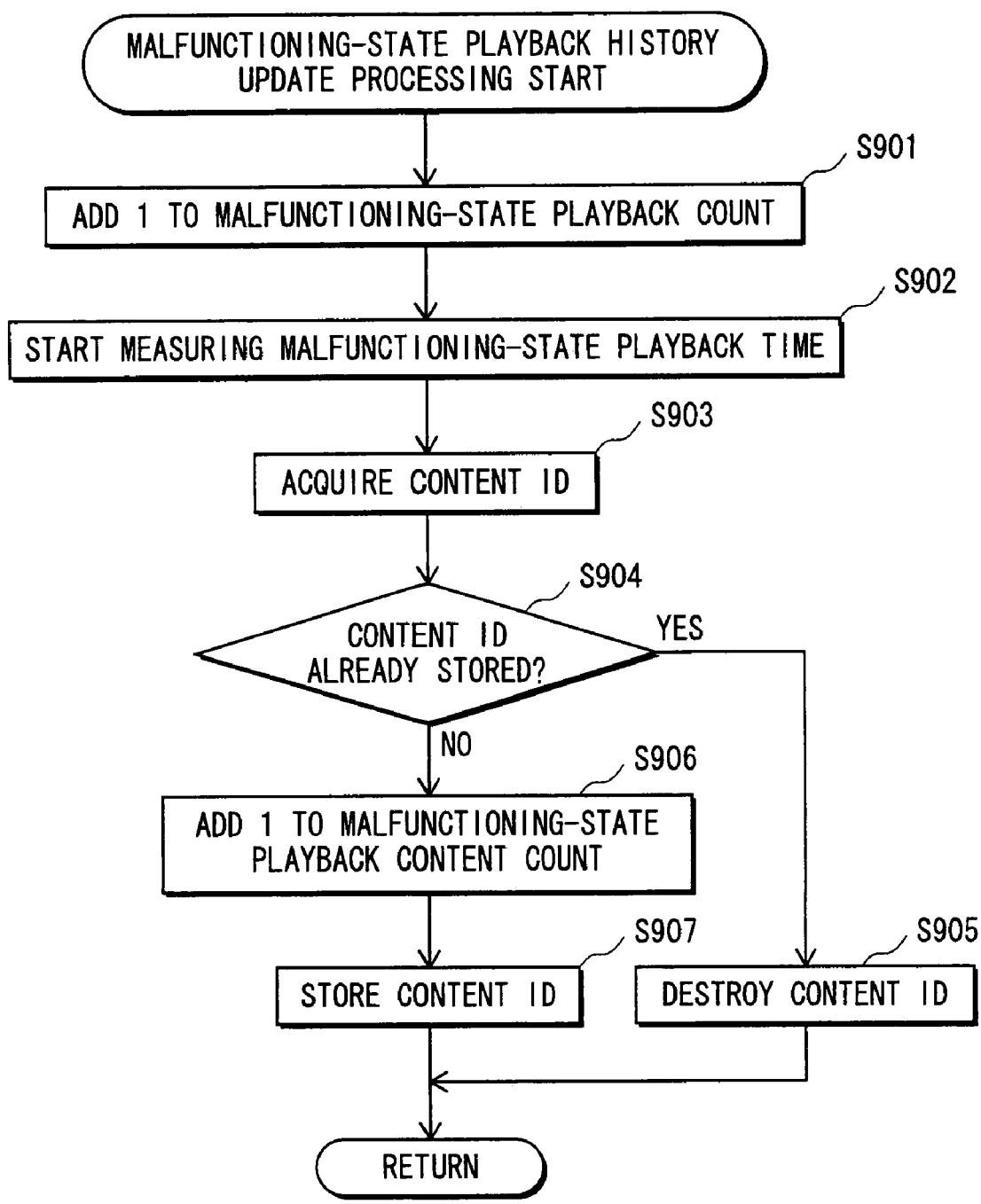
FIG. 19 is a flowchart showing operations for malfunctioning-state playback history update processing.

FIG. 19 is a flowchart showing operations for malfunctioning-state playback history update processing by the malfunctioning-state playback processing unit 214. Note that the operations shown here are the details of step S607 in FIG. 16. Furthermore, it is assumed that the operations shown here are performed by the malfunctioning-state playback processing management unit 214 after receiving an instruction from the content playability judgment unit 206 when the content playability judgment unit 206 has judged that playback processing is to be performed while the secure counter 211 is in a malfunctioning state.

The malfunctioning-state playback processing management unit 214 adds "1" to the malfunctioning-state playback count included in the malfunctioning-state playback history currently stored (step S901). Next, the malfunctioning-state playback processing management unit 214 starts measuring the malfunctioning-state playback time (step S902). Note that the malfunctioning-state playback processing management unit 214 adds the measured malfunctioning-state playback time to the value of the malfunctioning-state playback time already stored to update the malfunctioning-state playback time.

Next, the malfunctioning-state playback processing management unit 214 acquires the content ID of the content of which playback has been judged to be possible, from the content playability judgment unit 206 (step S903). The malfunctioning-state playback processing management unit 214 judges whether or not the content ID acquired at step S903 has already been stored as a played content ID in the malfunctioning-state playback history (step S904).

When the content ID has already been stored (YES at step S904), the malfunctioning-state playback processing management unit 214 destroys the content ID acquired at step S903 (step S905). When the content ID has not already been stored (NO at step S904), the malfunctioning-state playback processing management unit 214 adds "1" to the malfunctioning-state playback content count in the malfunctioning-state playback history (step S906), and stores the content ID as a played content ID (step S907).

Second Embodiment

The following describes a content playback system of a second embodiment with reference to the drawings.

The content playback system of the second embodiment is characterized in that playback of content is permitted even when the secure counter is in a malfunctioning state, on the condition that charge processing is performed at a later time.

<Structure>

The content playback system of the second embodiment is composed of a content usage rights management server 10a, a terminal 20a and a media 30a, with the content usage rights management server 10a and the terminal 20a being connected via a transmission path 40a. Note that the overall structure of the content playback system in the second embodiment is not illustrated since it is the same as that of the content playback system 1 of the first embodiment shown in FIG. 1.

1. Media 30*a*

As with the media 30, a specific example of the media 30*a* is an optical disc such as a BD or a DVD, and the media 30*a* stores a plurality of pieces of content data, each of which is composed of a content ID and content.

2. Content Usage Rights Management Server 10*a*

Figure 20:
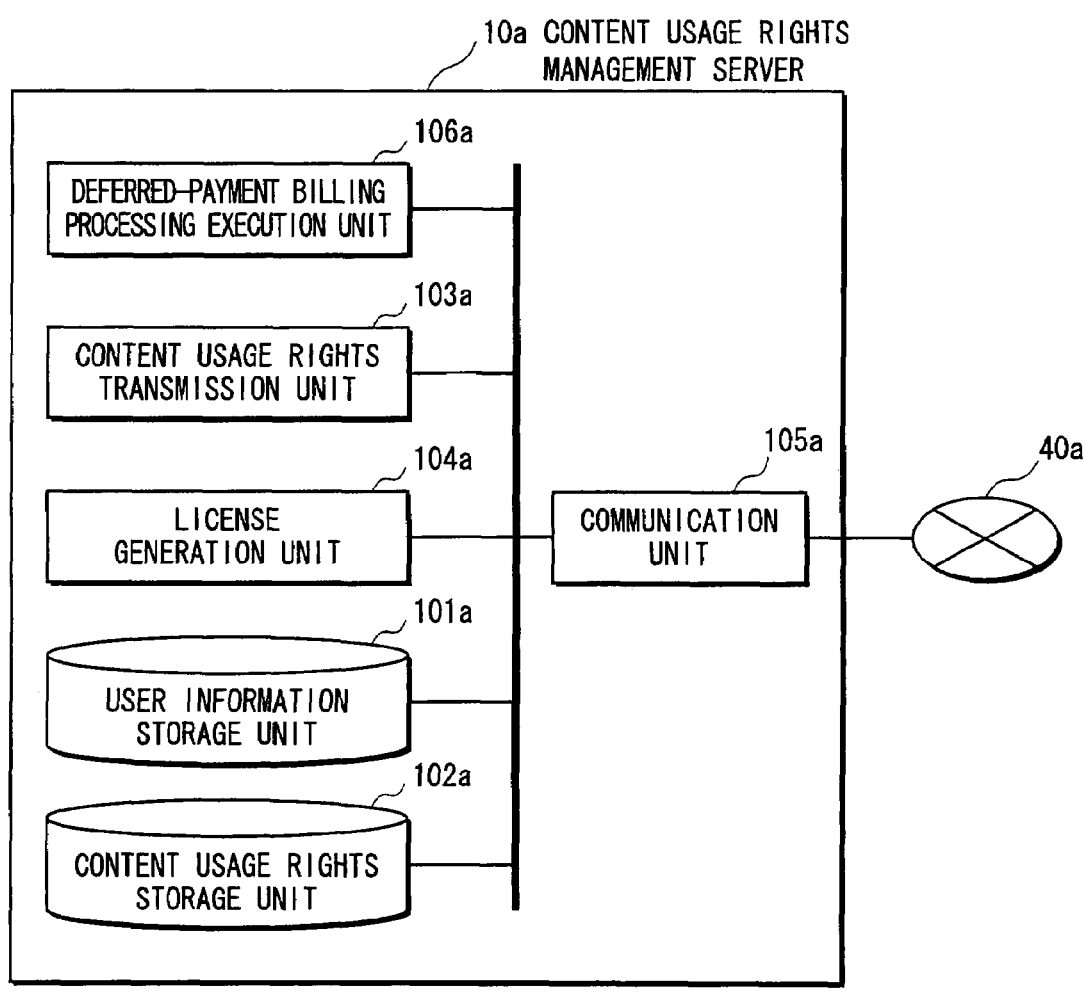
FIG. 20 is a functional block diagram functionally showing the structure of a content usage rights management server 10a in a second embodiment.

FIG. 20 is a function block diagram showing the structure of the content usage rights management server 10*a* functionally. As shown in FIG. 20 the content usage rights management server 10*a* is composed of a user information storage unit 101*a*, a content usage rights storage unit 102*a*, a content usage rights transmission unit 103*a*, a license generation unit 104*a*, a communication unit 105*a*, and a deferred-payment billing processing execution unit 106*a*.

The content usage rights management server 10*a* differs from the content usage rights management server 10 in terms of (a) the inclusion of the deferred-payment billing processing execution unit 106*a*, (b) different data structure of a content usage rights database 120*a* stored by the content usage rights storage unit 102*a*, and (c) different data structure of a license issue request response 140*a* generated by the license generation unit 104*a*.

The following omits a description of functions that are the same as the content usage rights management-server 10 of the first embodiment, and focuses on describing aspects that differ from the content usage rights management server 10.

(1) Content Usage Rights Storage Unit 102*a*

FIG. 21 shows the data structure of a content usage rights database 120*a* stored by the content usage rights storage unit 102*a*.

The content usage rights database 120*a* includes a plurality of content usage rights information, each of which is composed of one user ID and at least one content usage rights. Each content usage rights is composed of a content ID, a content key, a usage time limit, and deferred-payment billing permissibility information.

In other words, the contents usage rights differ from the first embodiment in terms of the additional inclusion of the deferred-payment billing permissibility information. The deferred-payment billing permissibility information is information showing whether or not to permit content playback on the condition that billing processing is performed at a later time.

The following is a description using a specific example. Content usage rights 121*a* includes a user ID "0001", and two usage rights 125*a* and 126*a* that are in correspondence with the user ID.

The usage rights 125*a* are composed of a content key 132*a* "000001", a usage time limit 133*a* "unlimited", and deferred-payment billing permissibility information 151*a* "not permitted". Since the deferred-payment billing permissibility information 151*a* is set to "not permitted", the user identified by the user ID "0001" is not able to play the content identified by the content ID 131*a* "111111" on the condition of performing billing processing later.

The usage rights 126*a* is composed of a content ID 134*a* "222221", a content key 135*a* "000002", a usage time limit 136*a* "2004/12/31 12:00", and deferred-payment permissibility information 152*a* "permitted". Since the deferred-payment permissibility information 152*a* is set to "permitted", the user is able to play the content identified by the content ID 134*a* "222221" on the condition of performing billing processing later.

(2) License Generation Unit 104*a*

As with the license generation unit 104 of the first embodiment, the license generation unit 104*a* generates a license issue request response 140*a* upon receiving a license issue request from the terminal 20*a*. However, the data structure of the generated license issue request response 140*a* is different to that of the license issue request response 140.

Figure 22:
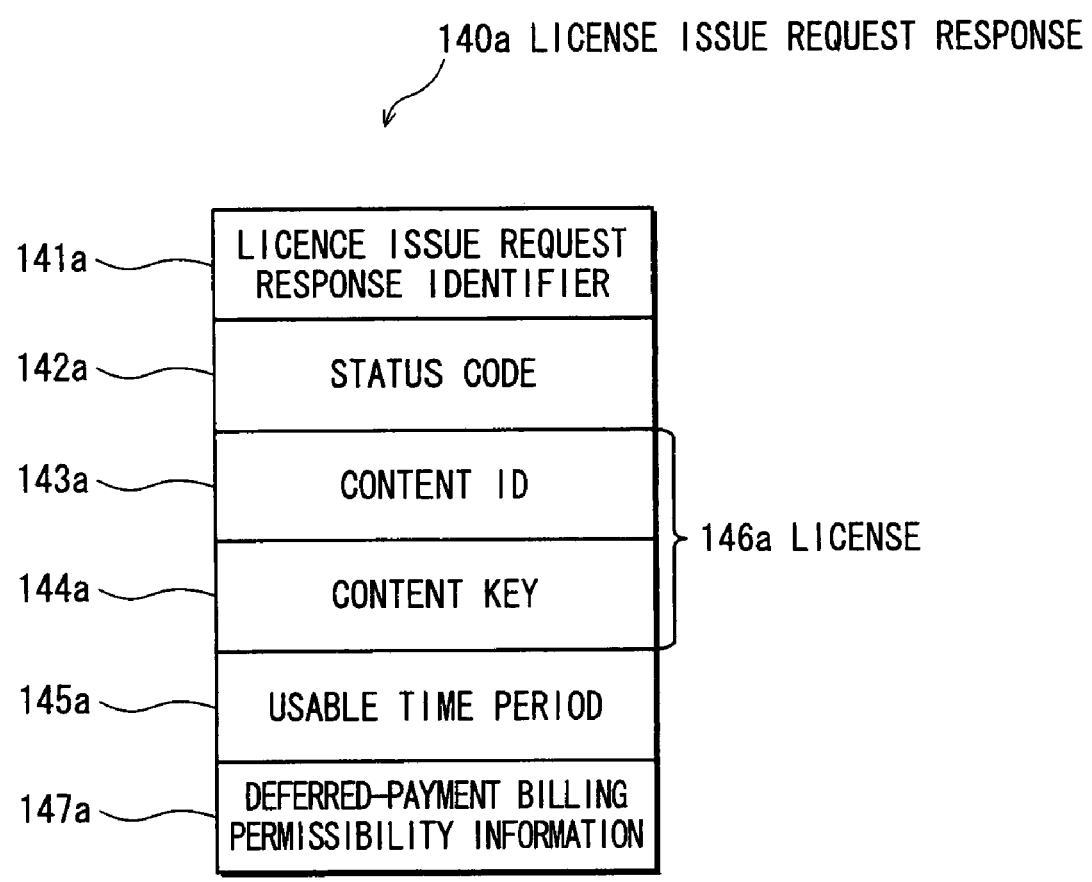

FIG. 22 shows the data structure of the license issue request response 140*a* generated by the license generation unit 104*a*. The license issue request response 140*a* is composed of a license issue request response identifier 141*a*, a status code 142*a*, a license 146*a*, a usable time period 145*a*, and deferred-payment billing permissibility information 147*a*. The license 146*a* is composed of a content ID 143*a* and a content key 144*a*.

As shown in FIG. 22, the license issue request response 140*a* is data that is the license issue request response 140 of the first embodiment with the addition of the deferred-payment billing permissibility information 147*a*. The deferred-payment billing permissibility information 147*a* is the same as the deferred-payment billing information described for FIG. 21.

(3) Deferred-Payment Billing Processing Execution Unit 106*a*

The deferred-payment billing processing execution unit 106*a* is the characteristic compositional element of the second embodiment. The deferred-payment billing processing execution unit 106*a* performs deferred-payment billing information upload processing shown in FIG. 30, and deferred-payment billing processing shown in FIG. 31. Details of the deferred-payment billing information upload processing and the deferred-payment billing processing performing billing processing performed by the deferred-payment billing processing execution unit 106*a* are given later.

3. Terminal 20*a*

Figure 23:
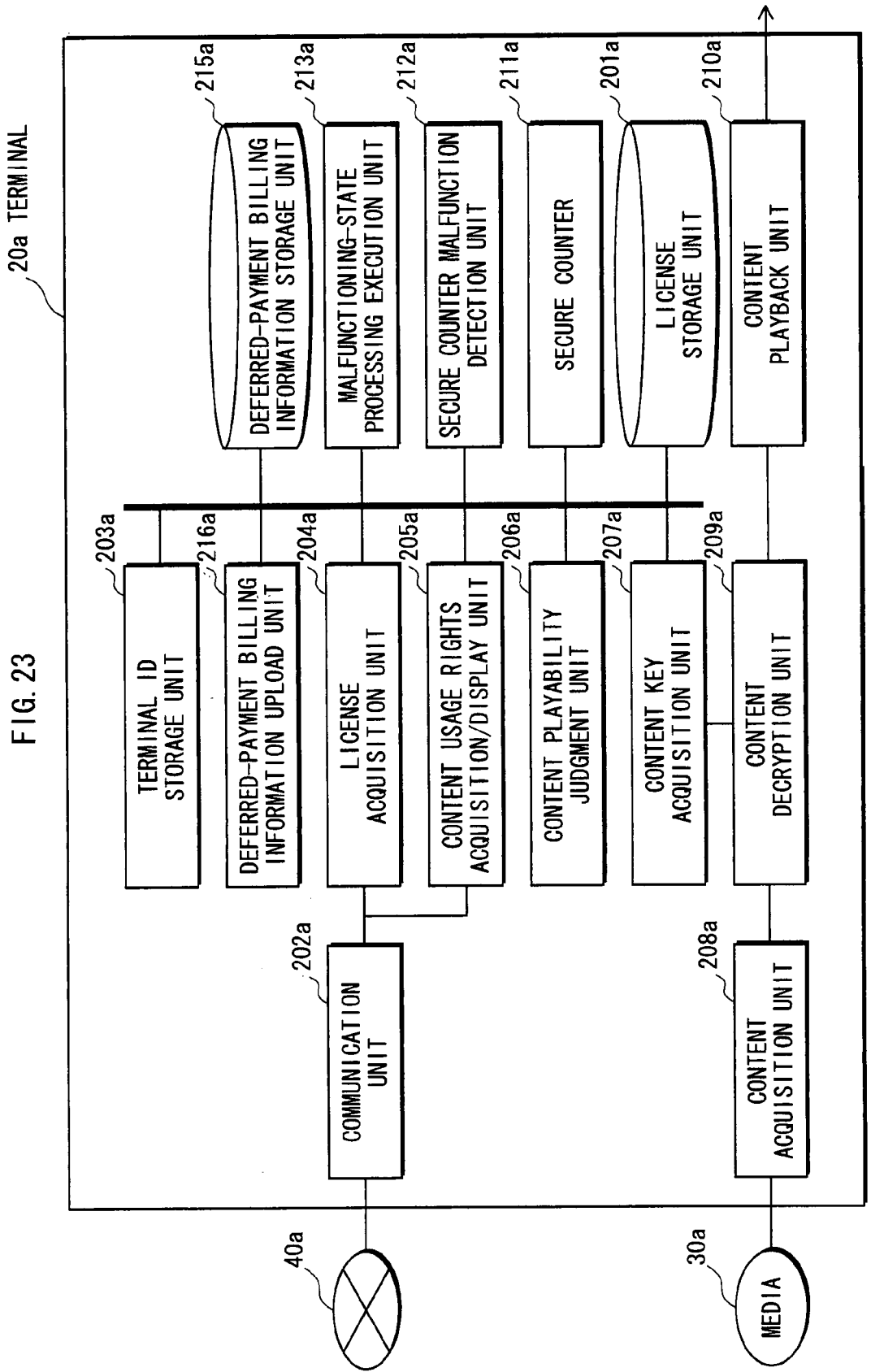
FIG. 23 is a function block diagram showing the structure of a terminal 20a functionally.

FIG. 23 is a function block diagram showing the structure of the terminal 20*a* functionally. As shown in FIG. 23, the terminal 20*a* is composed of a license storage unit 201*a*, a communication unit 202*a*, a terminal ID storage unit 203*a*, a license acquisition unit 204*a*, a content usage rights acquisition/display unit 205, a content playability judgment unit 206*a*, a content key acquisition unit 207*a*, a content acquisition unit 208*a*, a content decryption unit 209*a*, a content playback unit 210*a*, a secure counter 211*a*, a secure counter malfunction detection unit 212*a*, a malfunctioning-state processing execution unit 213*a*, a deferred-payment billing information storage unit 215*a*, and a deferred-payment billing information upload unit 216.

The terminal 20*a* of the second embodiment differs from the terminal 20 of the first embodiment is terms of (a) the omission of the malfunctioning-state playback processing management unit 214, (b) the inclusion of the deferred-payment billing information storage unit 215*a* and the deferred-payment billing information upload unit 216*a*, (c) the data structure of the license database 220*a* stored by the license storage unit 201*a*.

The following omits a description of functions that are the same as the terminal 20 of the first embodiment, and focuses on describing aspects that differ from the terminal 20.

(1) License Storage Unit 201*a*

FIG. 24 shows the data structure of the license database 220*a* stored by the license storage unit 201*a*. As shown in FIG. 24, the license database 220*a* includes license information 221*a*, 222*a*, 223*a* . . . .

Each license information includes a content ID, a content key, a usability counter upper limit, a usability counter upper limit reliability level, and deferred-payment billing permissibility information. In other words, the license information in the second embodiment has a structure that is the license information of the first embodiment with the addition of the deferred-payment billing permissibility information. The deferred-payment billing permissibility information is the same as that described for FIG. 21.

(2) Deferred-Payment Billing Information Storage Unit 215a

FIG. 25 shows the data structure of a deferred-payment billing information database 250a stored in the deferred-payment billing information storage unit 215a. As shown in FIG. 25, the deferred-payment billing information database 250a includes deferred-payment billing information 251a, 252a, 253a, . . . , each of which includes deferred-payment billing information, a content ID, a playback counter value, and a playback counter value reliability level.

The content ID is a content ID of content that was played on the condition of performing billing processing later. The playback counter value is the value of the secure counter 211a at the point in time at which playback was commenced of the content the that was played on the condition of performing billing processing. The playback counter value reliability level is information showing whether or not the counter value of the secure counter 211a was reliable at the point in time at which playback commenced.

Note that the deferred-payment billing information is generated by the content playability judgment unit 206a as described later, and at the time of being generated, the playback counter value reliability level is "reliable". When a malfunction in the secure counter 211a is detected subsequently, the playback counter value reliability level is set to "unreliable" by the malfunctioning-state processing execution unit 213a.

Here a specific example of the deferred-payment billing information 251a is given. The deferred-payment billing information 251a is composed of a content ID 254a "111111", a playback counter value 255a "0000100", and a playback counter value 256a "reliable". This shows that (i) the terminal 20a has played the content whose content ID is "111111" on the condition of performing billing processing later, (ii) the counter value of the secure counter 211a at the time of playback is "000100", and (iii) the counter value of the secure counter 211a is "reliable".

(3) Deferred-Payment Billing Information Upload Unit 216a

The deferred-payment billing information upload unit 216a has a function of uploading deferred-payment billing information to the content usage rights management server 10a.

Figure 26:
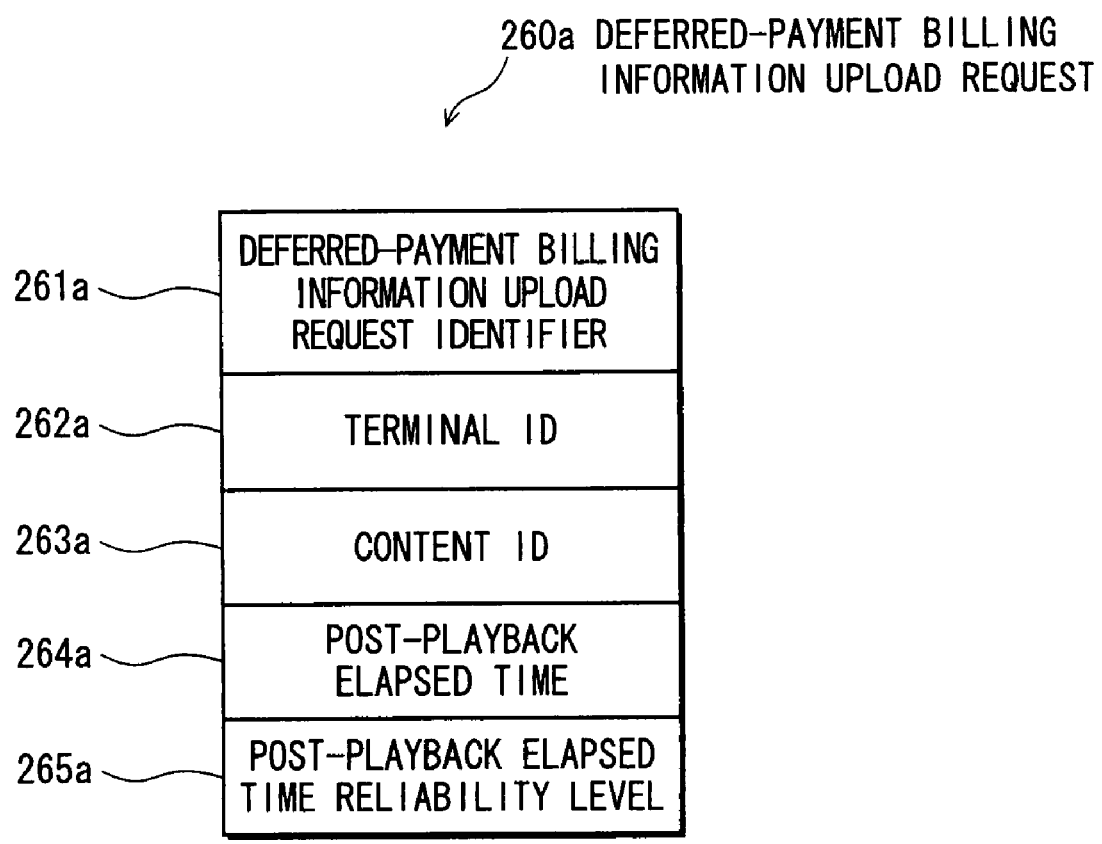

Specifically, the deferred-payment billing information upload unit 216a generates a deferred-payment billing information upload request 260a shown in FIG. 26. The deferred-payment billing information upload request 260a is composed of a deferred-payment billing information upload request identifier 261a, a terminal ID 262a, a content ID 263a, a post-playback elapsed time 264a, and a post-playback elapsed time reliability level 265a.

Written in the deferred-payment billing information upload request identifier 261a is information showing that the data is a deferred-payment billing information upload request. Written in the terminal ID 262a is the terminal ID stored by the terminal ID storage unit 203a. Written in the content ID 263a is the content ID included in the deferred-payment billing information to be uploaded. As one example, in the case of uploading the deferred-payment billing information 251a shown in FIG. 25, a content ID "111111" is written therein.

Written in the post-playback elapsed time 264a is the amount of time elapsed since the content was played. Note that the elapsed time since the content was played is calculated by subtracting the playback counter value from the counter value read from the secure counter 211a. Written in the post-playback elapsed time reliability level 265a is the same information as the information written in the playback counter value reliability level of the uploaded deferred-payment billing information. For instance, in the case of uploading the deferred-payment billing 251a, since "reliable" is written in the playback counter value reliability level 256a included therein, "reliable" is written in the post-playback elapsed time reliability level 265a.

<Operations>

The following describes operations in the content playback system of the second embodiment with reference to the flowcharts shown in FIG. 27 to FIG. 31.

Note that operations for license acquisition processing, license issuability judgment processing, license storage control processing, content playback processing, and playability judgment processing in the second embodiment are the same as operations in the flowchart shown in FIG. 12, the flowchart shown in FIG. 14, the flowchart shown in FIG. 15, the flowchart shown in FIG. 16, and the flowchart shown in FIG. 17, respectively, and therefore a description thereof is omitted.

1. Malfunctioning-State Processing

Figure 27:
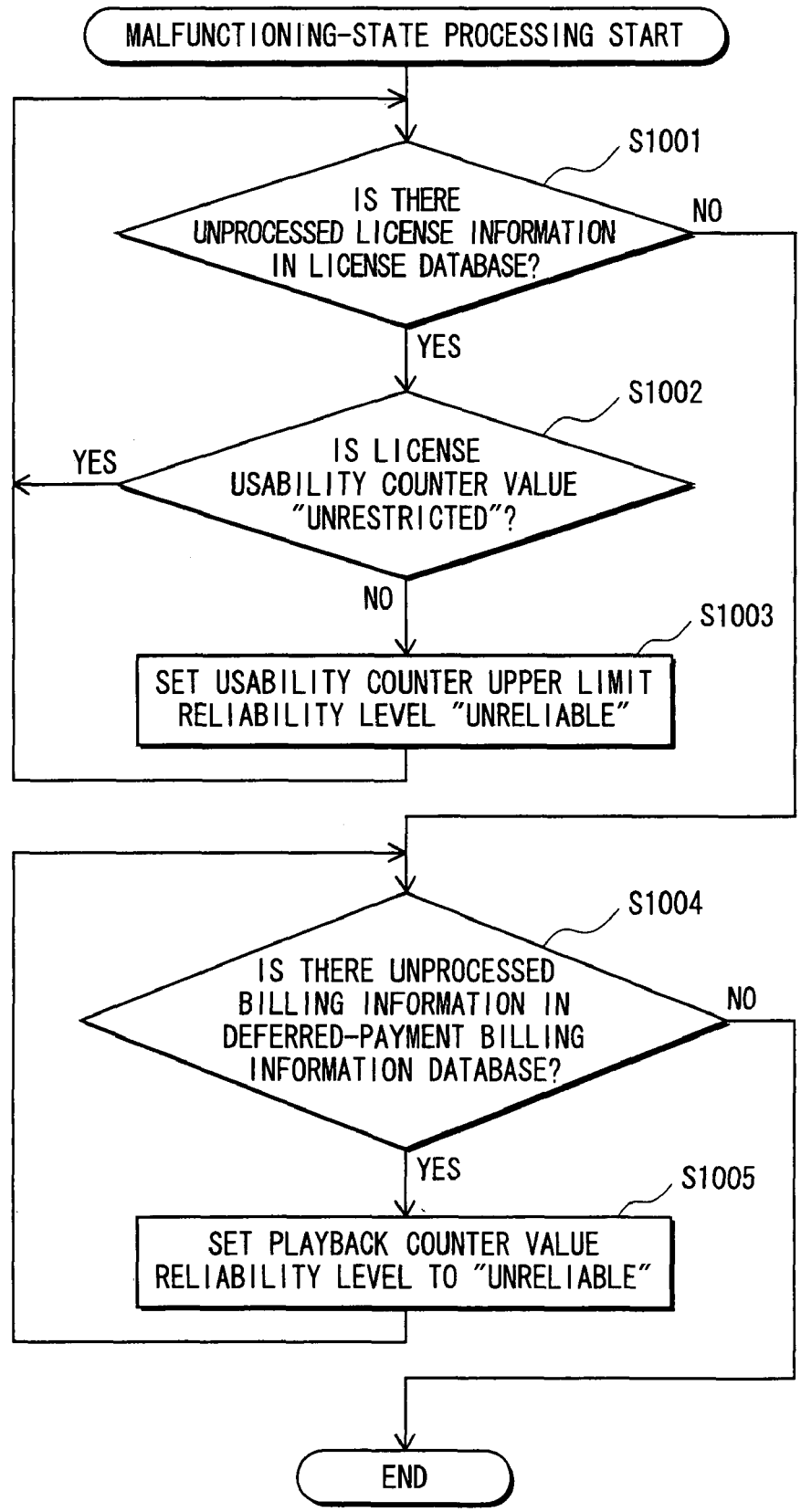
FIG. 27 is a flowchart showing operations for malfunctioning-state processing in the second embodiment.

FIG. 27 is a flowchart showing operations for executed by the malfunctioning-state processing execution unit 213a when the secure counter malfunction detection unit 212a detects a malfunction in the secure counter 211a.

The malfunctioning-state processing execution unit 213a checks whether or not any license information that has not been subject to malfunctioning-state processing exists in the license database 220a (step S1001).

When no unprocessed license information exists in the license database 220a (NO at step S1001), the malfunctioning-state processing execution unit 213a proceeds to step S1004. When any unprocessed license information exist in the license database 220a (YES at step S1001), the malfunctioning-state processing execution unit 213a targets one unprocessed license information and checks whether or not the usability counter upper limit included in the targeted license information is "unrestricted" (step S1002).

When the usability counter upper limit is "unrestricted" (YES at step S1002), the malfunctioning-state processing execution unit 213a returns to step S1001 and continues processing. When the usability counter upper limit is "unrestricted" (NO at step S1002), the malfunctioning-state processing execution 213a sets the usability counter upper limit reliability level included in the targeted license information to "unreliable" (step S1003), returns to step S1001, and continues processing.

Next, the malfunctioning-state processing execution unit 213a checks whether or not any deferred-payment billing information that has not yet been subject to malfunctioning-state processing exists in the deferred-payment billing information database 250a (step S1004) When any unprocessed deferred-payment billing information exist in the deferred-payment billing information (YES at step S1004), the malfunctioning-state processing execution unit 213a sets the playback counter value reliability level associated with the deferred-payment billing processing information to "unreliable" (step S1005), returns to step S1004, and continues processing. When no unprocessed deferred-payment billing processing information exists in the deferred-payment billing information database 250a (NO at step S1004), the malfunctioning-state processing execution unit 213a ends the malfunctioning-state processing.

2. License Issue Request Response Generation Processing

Figure 28:
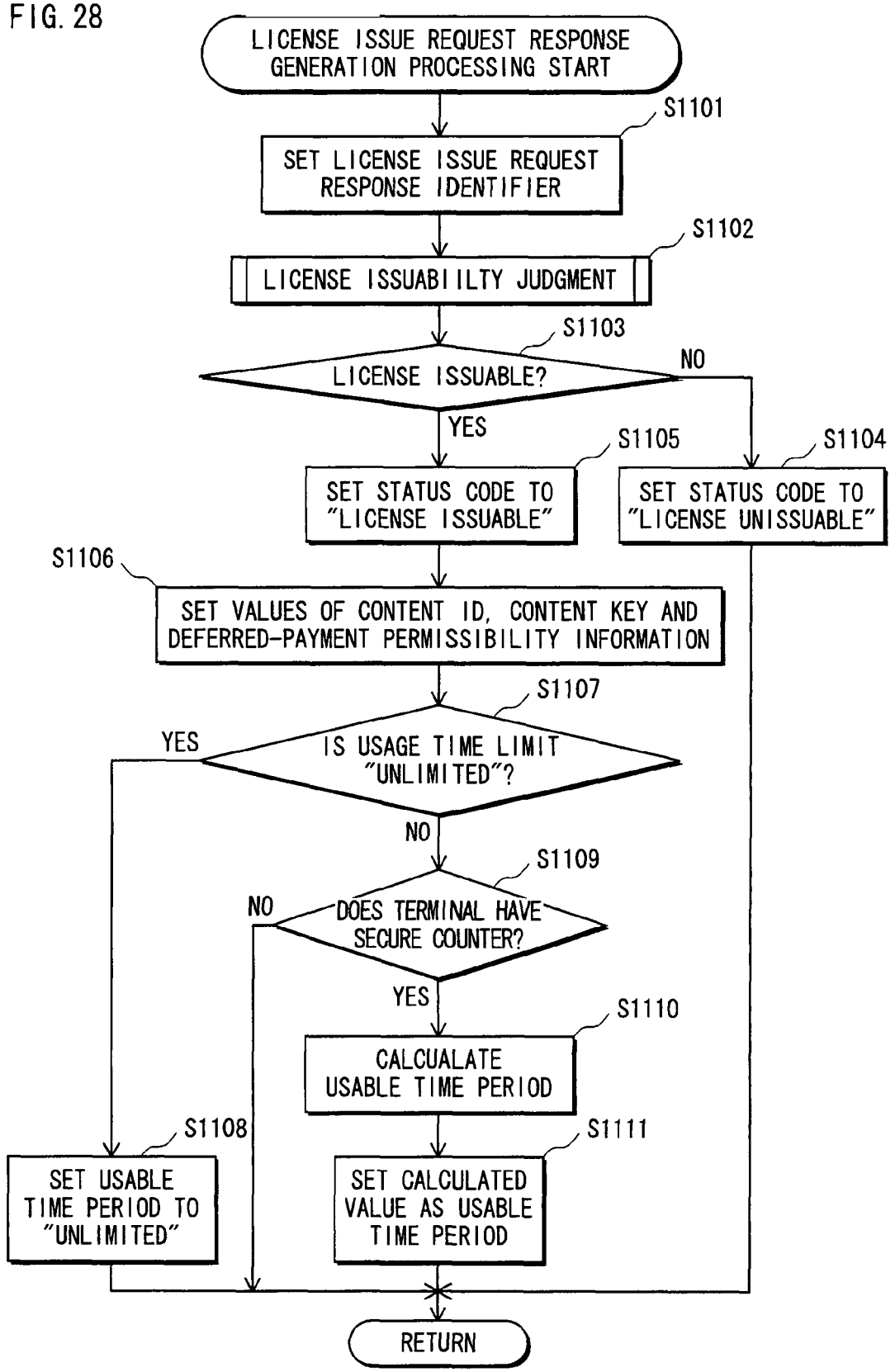
FIG. 28 is a flowchart showing operations for response issue request response generation processing in the second embodiment.

FIG. 28 is a flowchart showing operations for license issue request response generation processing by the content usage rights management server 10a, in license acquisition processing between the content usage rights management server 10a and the terminal 20a. Note that the operations shown here are the details of step S203 of the flowchart shown in FIG. 12.

The license generation unit 104a sets a predetermined value in the license issue request response identifier 141a of the license issue request response 140a (step S1101). The license generation unit 104a then specifies the usage rights based on the content usage rights database 120a, and performs license issuability judgment (step S1102).

When as a result of the license issuability judgment it is judged that a license is not issuable (NO at step S1103), the license generation unit 104a sets the status code 142a to "license not issuable" (step S1104).

When as a result of the license issuability judgment it is judged that a license is issuable (YES at step S1103), the license generation unit 104a sets the status code 142a to "license issuable" (step S1105).

The license generation unit 104a refers to the content usage rights database 120a to set the respective values of the content ID 143a, the content key 144a, and the deferred-payment billing permissibility information 147a of the license issue request response 140a being generated (step S1106).

For instance, in the case of the usage rights 126a being designated at step S1102, the license generation unit 104a sets "222221" in the content ID 143a, "000002" in the content key 144a, and "permitted" in the deferred-payment billing permissibility information 147a.

Next, the license generation unit 104a refers to the content usage rights database 120a to check whether or not the usage time limit included in the usage rights specified at step S1102 is "unlimited" (step S1107), and when the usage time limit is "unlimited" (YES at step S1107), the license generation unit 104a sets "unlimited" in the usable time period 145a of the license issue request response 140a being generated (step S1108), and then ends the license issue request response generation processing.

When the usage time limit is not "unlimited" (NO at step S1107), the license generation unit 104a refers to the terminal capability information included in the license issue request received from the terminal 20a, to check whether or not the terminal 20a has a secure counter (step S1109). When the terminal 20a does not have a secure counter (NO at step S1109), the license generation unit 104a ends the license issue request response processing. Note that in this case the usable time period 145 does not exist in the generated license issue request response 140a.

When the terminal 20a has a secure counter (YES at step S1109), the license generation unit 104a calculates a usable time period with use of the current date and time, and the usage time limit in the usage rights specified at step S1102. (step S1110). Note that the usable time period is calculated by calculating the length of time from the current date and time to the date and time set in the usage time limit.

The license generation unit 104a sets the value calculated at step S1110 in the usable time period 145a of the license issue request response 140a (step S1111), and then ends the license issue request response generation processing.

3. Malfunctioning-State Playability Judgment Processing

Figure 29:
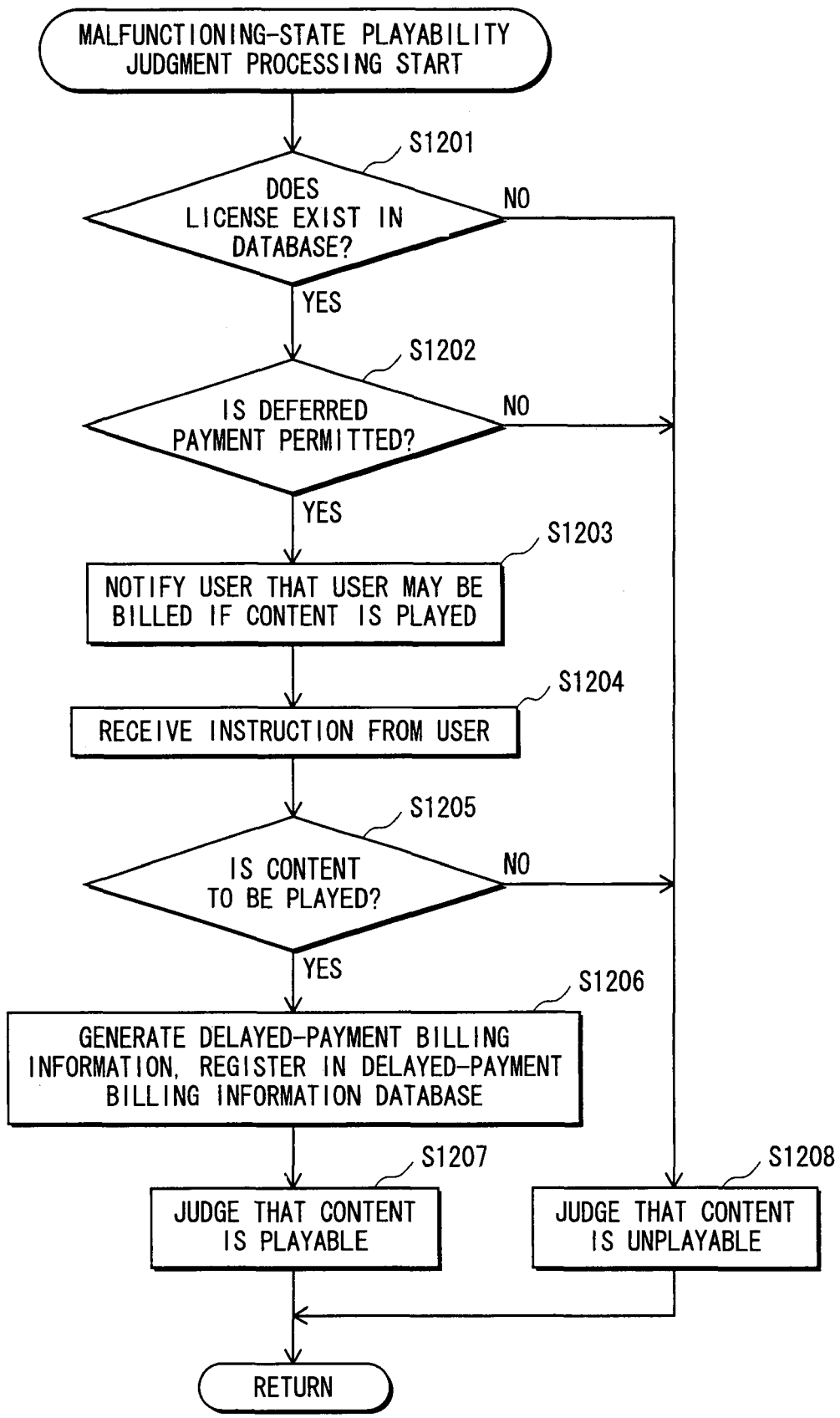
FIG. 29 is a flowchart showing operations for malfunctioning-state playability judgment processing in the second embodiment.

FIG. 29 is a flowchart showing operations for malfunctioning-state playability judgment processing by the terminal 20a. Note that the operations shown here are the details of step S605 of FIG. 16.

The content playability judgment unit 206a checks whether or not a license including the content ID received from the user as the content of which playback is requested, exists in the license database 220a (step S1201). When the license does not exist (NO at step S1201), the content playability judgment unit 206 proceeds to step S1208.

When the license does exist (YES at step S1201), the license playability judgment unit 206a refers to the deferred-payment billing permissibility information included in the license information, to check whether or not the content is permitted to be played on the condition that deferred-payment billing processing later (step S1202).

When playback of the content is not permitted to be played on the condition that deferred-payment billing processing is performed (NO at step S1202), the content playability judgment unit 206a proceeds to step S1208.

When playback of the content is permitted to be played on the condition that deferred-payment billing is performed (YES step S1202), the content playability judgment unit 206a notifies the user that the user may be billed if the requested content is played (step S1203), and subsequently receives an instruction, from the user, showing whether or not to play the content (step S1204).

When the instruction from the user shows that the content is not to be played (NO at step S1205), the content playability judgment unit 206a determines the content to be unplayable (step S1208). When the instruction from the user shows that the content is to be played (YES at step S1205), the content playability judgment unit 206a generates deferred-payment billing information 215a, and registers the generated deferred-payment billing information in the deferred-payment billing information database 250a stored in the deferred-payment billing information storage unit 215a (step S1206).

Here, the content playability judgment unit 206a sets the content ID in the deferred-payment billing information to be the content ID of the content of which playback was requested by the user. Furthermore, the content playability judgment unit 206a reads the current counter value from the secure counter 211a, and sets the read counter value as the playback counter value in the deferred-payment billing information, and sets the playback counter reliability level in the deferred-payment billing information to "reliable".

The content playability judgment unit 206a determines that the content of which the user requested playback is playable (step S1207).

4. Operations for Deferred-Payment Billing Information Upload Processing

Figure 30:
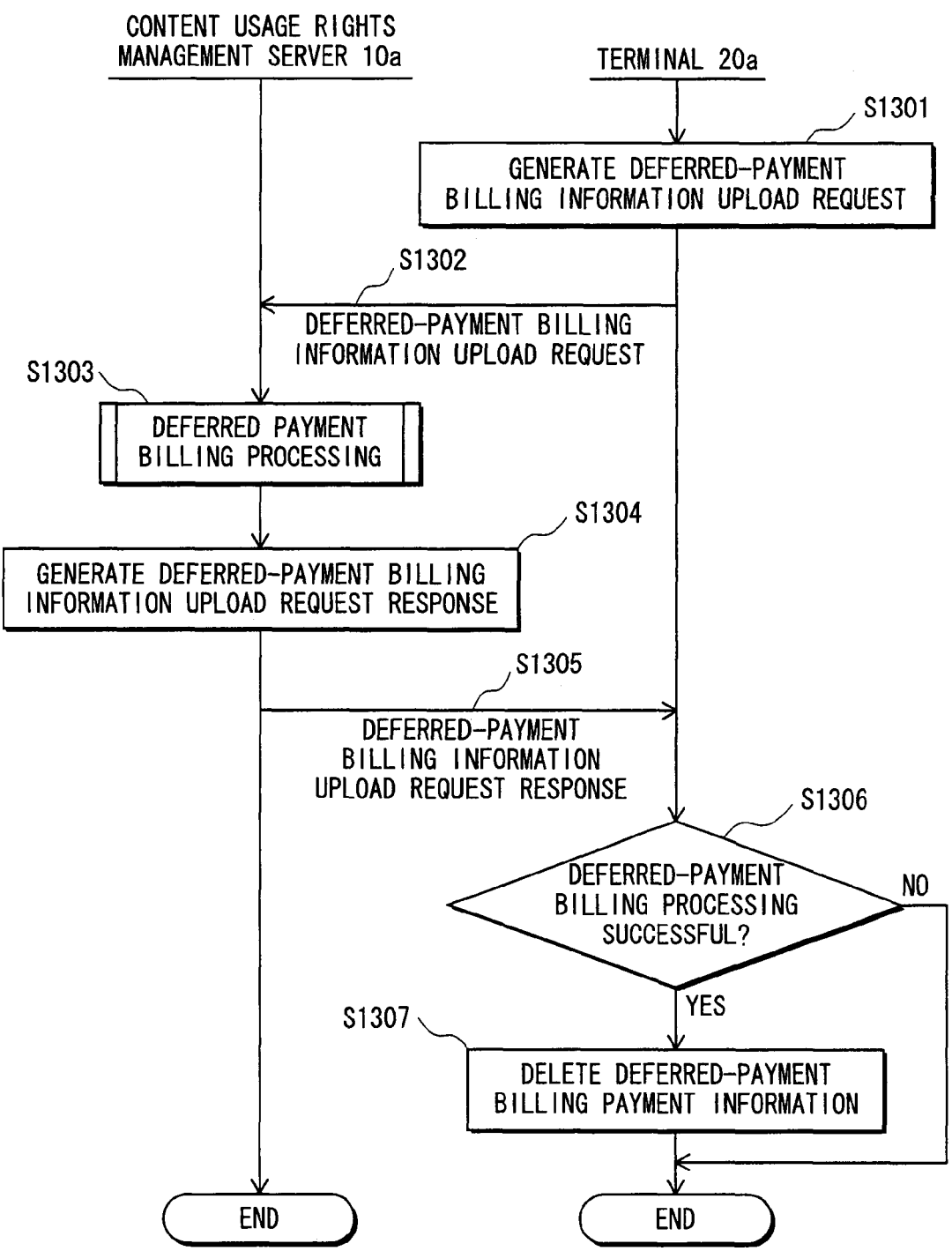
FIG. 30 is a flowchart showing operations for deferred-payment billing processing in the second embodiment.

FIG. 30 is a flowchart showing operations for deferred-payment billing information upload processing in the content usage rights management server 10a and the terminal 20a.

The deferred-payment billing information upload unit 216a of the terminal 20a generates the deferred-payment billing upload request 260a shown in FIG. 26 (step S1301).

The deferred-payment billing information upload unit 216a transmits the deferred-payment billing upload request 260a to the content usage rights management server 10a via the communication unit 202a and the transmission path 40a, and the communication unit 105 of the content usage rights management server 10a receives the deferred-payment billing information upload request 260a (step S1302).

The deferred-payment billing processing execution unit 106a of the content usage rights management server 10a receives the deferred payment billing upload request 260a, performs deferred payment billing processing (step S1303), and then generates a deferred-payment billing upload request response (step S1304).

Note that while the data structure of the deferred-payment billing upload request response is not illustrated, the deferred-payment billing upload request response is data composed of an identifier showing that the data is a deferred-payment billing upload request, and information showing whether or not the deferred-payment billing processing succeeded.

The deferred-payment billing processing execution unit 106a transmits the deferred-payment billing information upload request response to the terminal 20a via the communication unit 105a and the transmission path 40a, and the communication unit 202a of the terminal 20a receives the deferred-payment billing information upload request response (step S1305).

Upon receiving the deferred-payment billing information upload request response, the deferred-payment billing information upload unit 216a refers to the received response to check whether or not the deferred-payment billing processing succeeded (step S1306). When the deferred-payment billing processing did not succeed (NO at step S1306), the deferred-payment billing information upload unit 216a ends the processing. When the deferred-payment billing processing succeeded (YES at step S1306), the deferred-payment billing information upload unit 216a deletes the deferred-payment billing information for which upload succeeded, from the deferred-payment billing information database 250a (step S1307), and ends the processing.

5. Deferred-Payment Billing Processing

Figure 31:
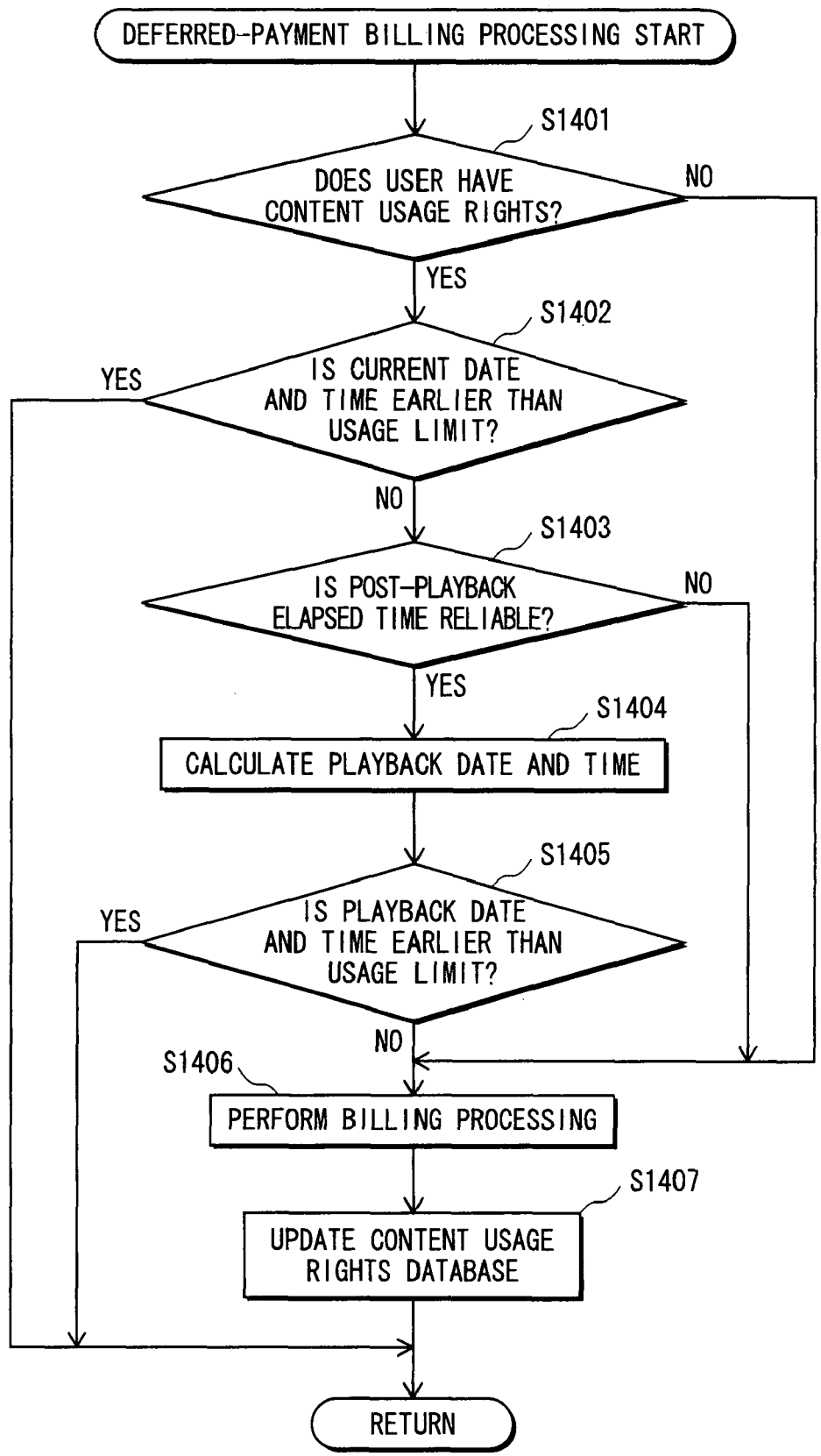
FIG. 31 is a flowchart showing operations for deferred-payment billing processing in the second embodiment.

FIG. 31 is a flowchart showing operations for deferred-payment billing processing by the deferred-payment billing processing execution unit 106a of the content usage rights management server 10a. Note that the operations shown here are the details of step S1303 of FIG. 30.

First, the deferred-payment billing processing execution unit 106a refers to the terminal ID in the deferred-payment billing information upload request received from the terminal 20a at step S1303 (FIG. 30), to specify the user ID of the user making the request to upload the deferred-payment billing information.

Next, the deferred-payment billing processing execution unit 106a refers to the content usage rights database 120a in the content usage rights storage unit 102a, to determine whether or not the user requesting the uploading of the deferred-payment billing information has usage rights for the content identified by the content ID 263a in the deferred-payment billing information upload request 260a (step S1401). Specifically, the deferred-payment billing processing execution unit 106a judges whether or not the content ID 263a is included in the content usage rights information that includes the user ID that has just been specified.

When it is determined that the user does not have usage rights (NO at step S1401), the deferred-payment billing processing execution unit 106a proceeds to step S1406. When it is determined that the user has usage rights (YES at step S1401), the deferred-payment billing processing execution unit 106a specifies the usage rights as a processing target of subsequent processing.

The deferred-payment billing processing execution unit 106a then refers the usage rights specified as the processing target, to determine whether or not the current date and time is earlier than the usage time limit (step S1402).

When the current date and time are earlier than the usage time limit (YES at step S1402), the deferred-payment billing processing execution unit 106a does not perform billing processing.

When the current date and time are not earlier than the usage time limit (NO at step S1402) the deferred-payment billing processing execution unit 106a refers to the post-playback elapsed time reliability level 265a in the deferred-payment billing information upload request 260a received from the terminal 20a at step S1302 (FIG. 30), to check whether or not the post-playback elapsed time 264a is reliable information (step S1403).

When the post-playback elapsed time reliability level 265a is set to "unreliable" and the post-playback elapsed time 264a is unreliable information (YES at step S1403), the deferred-payment billing processing execution unit 106a proceeds to step S1406 and continues processing.

When the post-playback elapsed time reliability level 265a is set to "reliable" and the post-playback elapsed time 264a is reliable information (YES at step S1403), the deferred-payment billing processing execution unit 106a calculates, from the current date and time and the post-playback elapsed time 264, a playback date and time of the content (step S1404). Specifically, the playback date and time of the content is calculated by counting backwards from the current date and time by an amount of time set in the post-playback elapsed time 264a. For instance, if the current date and time is "2004/8/6 10:00" and the time set in the post-playback elapsed time 264a is "120 minutes", the content usage date and time that is calculated is "2004/8/6 8:00".

Next, the deferred-payment billing processing execution unit 106a refers to the targeted usage rights to judge whether or not the content playback date and time calculated at step S1404 is earlier than the usage time limit in the targeted usage rights (step S1405).

When the content playback date and time is earlier than the usage time limit (YES at step S1405), the deferred-payment billing processing execution unit 106a does not perform billing processing. When the content playback date and time is not earlier than the usage time limit (NO at step S1405), the deferred-payment billing processing execution unit 106a refers to the user information storage unit 101a to execute processing to bill the user for the content (step S1406).

When the user newly acquires usage rights for the content as a result of billing processing executed at step S1406, the deferred-payment billing processing execution unit 106a updates the content rights usage database 120a by registering the usage rights for the acquired content usage rights in the content usage rights database 120a (step S1407).

<<Modifications>>

The present invention has been described based on, but is not limited to, the above preferred embodiments. The following cases are included in the present invention.

(1) Although the terminal has a structure of acquiring content from the media in the preferred embodiments, the present invention is not limited to this structure, and the terminal may have a structure of acquiring content from a content distribution server via a transmission path.

Furthermore, the terminal may include a storage unit for accumulating and storing content acquired via the transmission path.

(2) Although the usability counter-upper limit is managed in the license database in the preferred embodiments, the present invention is not limited to this structure. Instead of the usability counter upper limit, the present invention may have a structure of managing the counter value of the secure counter when a license is acquired and the usable time period included in the license issue request response.

In this case, in the playability judgment processing shown in FIG. 17, the usability counter upper limit is calculated from the two aforementioned pieces of information by performing processing in the same way as step S504 of FIG. 15.

(3) Although the terminal capability information is included in the license issue request in the preferred embodiments, the present invention is not limited to this structure. The present invention may be structured such that terminal capability information is notified by the terminal to the content usage rights management server when membership registration processing is performed in advance, and the content usage rights management server manages the terminal capability information in the user information database.

(4) In the above embodiments, the license issue request response generated by the content usage rights management server is structured such that the usable time period is omitted in cases that the license is usable only directly after the license is issued (NO at step S309 in FIG. 13). However, the present invention is not limited to this, and instead of being omitted, the usable time period may be set to a predetermined value such as "0".

Furthermore, other than the usage time limit, the license issue request response may include information showing whether or not the license is usable only directly after being issued.

When information showing that the license is usable only directly after being issued is set in a received license issue request response, the terminal deletes the license as soon as it is used, instead of registering it in the license database.

(5) In the preferred embodiments, the content usage rights management server has a structure of calculating the usable time period in the license issue request response generation processing by calculating the amount of time from the current date and time to the date and time set in the usage time limit of the usage rights (step S310 of FIG. 13). In the present invention, the content rights usage management server may set a value that is smaller than the calculated value.

For instance, in the case that the value countable by the secure counter of the terminal has an upper limit and the value calculated using the described method is equal to or greater than the upper limit, the content usage rights management server may set a lower value that is within the range of values countable by the secure counter. Here, the value countable by the secure counter may be a predetermined value used throughout the entire system, or may be set separately for each terminal. In the case of the countable value being set differently for each terminal, the countable value for the particular terminal may be included in the terminal capability information in the license issue request that the terminal transmits to the content usage rights management server.

(6) The processing for calculating the usability counter upper limit in the license storage control processing by the terminal (step S504 of FIG. 15) in the preferred embodiments may be performed by the content usage rights management server instead of the terminal. In this case, the counter value of the secure counter is included in the license issue request when transmitted, and the content usage rights management server calculates the usability counter upper limit from the counter value included in the received license issue request and the usage time limit set in the usage rights. The content usage rights management server transmits a license issue request response that includes the calculated usability counter upper limit instead of the usable time period.

(7) In the first embodiment, the terminal has a structure of determining whether content is playable by, as the malfunctioning-state playability judgment processing, checking whether or not the malfunctioning-state playback count, the malfunctioning-state playback time, the malfunctioning-state playback content count, and the malfunction elapsed time are less than respective pre-set values (FIG. 18). However, the malfunctioning-state playability judgment processing in the present invention is not limited to this.

For instance, a measurement unit may keep a count of how many times a malfunction has occurred, and the judgment of playability may be performed in accordance with the count. In this case, playback may be judged to be permitted when the count is less than a predetermined value, and may be judged to be prohibited when the count is equal to or greater than the predetermined value.

Alternatively, malfunctioning-state playability judgment processing may be performed in accordance with an attribute of a terminal. Specifically, attribute information may be managed that shows the terminal to be either an "online device" that is able to be connected to a network at all times, or an "offline device" that is not able to be connected to a network at all times. The malfunctioning-state playability judgment processing may be performed based on this attribute information. Note that the attribute of the terminal is not limited to being a communication attribute such as the aforementioned.

(8) In the first embodiment, the malfunctioning-state playback conditions showing what conditions are to be met for playback to be permitted is stored in advance in the terminal. However, in the present invention, instead of the terminal storing the malfunctioning-state playback conditions in advance, the content usage rights management server may notify the terminal of the malfunctioning-state playback conditions by including the malfunctioning-state playback conditions in the license issue request response.

(9) In the billing processing in the second embodiment, when the post-playback elapsed time is unreliable (NO at step S1403 of FIG. 31), the content usage rights management server performs billing processing (step S1406). However, the content usage rights management apparatus of the present invention may have a structure of not performing billing processing if a predetermined condition is met, even if the judgment result at step S1403 is "NO" and the post-playback elapsed time is unreliable.

Here, as one example of the predetermined condition, a count may be kept of how many times the post-playback elapsed time is counted as being unreliable (the number of times the result at step S1403 is "NO"), and the billing processing is not performed when the value of the count is equal to or less than a predetermined value.

(10) In the preferred embodiments, the terminal has a secure counter. However, instead of having a secure counter, the terminal may have a secure clock that provides accurate time information.

As with the secure counter, the secure clock is tamper-resistant, and the time information is unable to be modified.

Furthermore, the secure clock has a time information correction unit that, as necessary, corrects the time information managed by the secure clock itself, by acquiring accurate time information from a reliable clock information provision unit via a transmission path.

In addition, the secure clock may store secure clock reliability level information showing whether or not the time information managed by the secure clock itself is reliable. In a case such as power to the secure clock being cut and the time information being judged to be unreliable, the secure clock sets the secure clock reliability level information to "unreliable". The secure clock then acquires accurate time information from the time information provision unit, and after correcting the time information that it (the secure clock) manages, changes the secure clock reliability level information to "reliable".

In the case that the terminal has the secure clock instead of the secure counter, instead of the usability counter upper limit and the usability counter upper limit reliability level, the license database in the license storage unit manages a usage time limit that is the same as the usage time limit managed by the content usage rights management server in the content usage rights management database.

Furthermore, in the playability judgment processing (FIG. 17) in the terminal, instead of referring to the usability counter upper limit reliability level, the terminal refers to the secure clock reliability level information (step S702) to check the reliability of the time information provided by the secure clock. Furthermore, instead of referring to the usability counter upper limit, the terminal refers to the usage time limit, and judges whether or not the content is playable based on the usage time limit and time information provided by the secure clock (step S703).

(11) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(12) The present invention may be any combination of the above-described embodiment and modifications.

INDUSTRIAL APPLICABILITY

In industries that perform content distribution and content rental using package media such as DVD and BD, the present invention can provide a playback apparatus that takes convenience for the user into consideration.

The invention claimed is:

1. A content playback apparatus comprising:
    a license storage unit operable to store license information including a usable time period for which content is usable;
    a measurement unit operable to measure time;
    a malfunction detection unit operable to detect a malfunction of the measurement unit;
    a license requesting unit operable to, when the malfunction detection unit detects the malfunction, issue a request to a license server to retransmit the license information and reacquire the license information from the license server, the license server being a distribution source of the license information and being connected to the content playback apparatus via a network;
    a determination unit operable to, when the malfunction detection unit has not detected the malfunction, determine that playback of the content is possible when the time measured by the measurement unit is within the usable time period;
    a restriction unit operable to, when the malfunction detection unit detects the malfunction, place a restriction on the playback of the content until the license requesting unit reacquires the license information; and
    a playback unit operable to playback the content when the determination unit determines that the playback of the content is possible,
    wherein the playback unit plays back the content when the license requesting unit has reacquired the license information.

2. The playback apparatus of claim 1, wherein, when the malfunction detection unit detects the malfunction, the restriction unit (i) judges whether or not a predetermined condition is met, and (ii) only when the predetermined condition is judged to be met, controls the restriction of the playback of the content so as to permit the playback of the content until the license requesting unit reacquires the license information.

3. The content playback apparatus of claim 2,
    wherein the license storage unit stores the license information including the usable time period and key information, the key information being for decrypting the content that is in an encrypted state, and
    wherein the playback unit acquires the encrypted content, decrypts the encrypted content using the key information to generate the content, and plays back the generated content when (i) the determination unit determines that the playback of the content is possible and (ii) the restriction unit permits the playback of the content.

4. The content playback apparatus of claim 3, wherein the restriction unit judges whether or not the predetermined condition is met by a playback history, the playback history being a record of content playback by the playback unit while the malfunction of the measurement unit previously existed, and controls the restriction of the playback of the content so as to permit the playback of the content only when the predetermined condition is judged to be met by the playback history.

5. The content playback apparatus of claim 4,
    wherein the restriction unit includes:
        a condition storage subunit operable to store a predetermined count as the predetermined condition;
        a history management subunit operable to manage a playback count as the playback history; and
        a judgment subunit operable to compare the predetermined count and the playback count, and when the playback count is less than the predetermined count, judge that the predetermined condition is met, and
    wherein the history management subunit updates the playback count when the judgment subunit judges that the predetermined condition is met.

6. The content playback apparatus of claim 4,
    wherein the restriction unit includes:
        a condition storage subunit operable to store a predetermined time length as the predetermined condition;
        a history management subunit operable to manage a playback time length as the playback history; and
        a judgment subunit operable to compare the predetermined time length and the playback time length, and when the playback time length is shorter than the predetermined time length, judge that the predetermined condition is met, and wherein the history management subunit, when the judgment subunit judges that the predetermined condition is met, commences measuring time and updates the playback time length.

7. The content playback apparatus of claim 4, wherein the restriction unit includes:
   a condition storage subunit operable to store a predetermined content count as the predetermined condition;
   a history management subunit operable to manage a played content count as the playback history, the played content count being a total number of contents previously played by the playback unit; and
   a judgment subunit operable to compare the predetermined content count and the played content count, and when the played content count is less than the predetermined content count, judge that the predetermined condition is met.

8. The content playback apparatus of claim 7,
   wherein the license storage unit stores the license information including the usable time period, the key information and content identification information, the content identification information identifying the content,
   wherein the history management subunit further stores, as the playback history, content identification information identifying previously played content, and
   wherein the history management subunit, (i) when the judgment subunit determines that the predetermined condition is met, judges whether or not the content identification information stored in the history management subunit includes content identification information identifying the content identified by the content identification information included in the license information, and (ii) when the content identification information stored in the history management unit does not include content identification information identifying the content identified by the content identification information included in the license information, stores content identification identifying the content identified by the content identification information included in the license information, and updates the played content count.

9. The content playback apparatus of claim 2, wherein the restriction unit includes:
   a malfunction elapsed time measurement subunit operable to measure a malfunction elapsed time from when the malfunction detection unit detects the malfunction;
   a condition storage subunit operable to store a predetermined time length as the predetermined condition; and
   a judgment subunit operable to compare the malfunction elapsed time and the predetermined time length, and when the malfunction elapsed time is less than the predetermined time length, judge that the predetermined condition is met.

10. The content playback apparatus of claim 3, wherein the restriction unit includes:
    a malfunction count management subunit operable to manage a malfunction count that is a total number of times that the malfunction detection unit has detected the malfunction;
    a condition storage subunit operable to store a predetermined count as the predetermined condition; and
    a judgment subunit operable to compare the malfunction count and the predetermined count, and when the malfunction count is less than the predetermined count, judge that the predetermined condition is met.

11. The content playback apparatus of claim 2, wherein the restriction unit stores attribute information indicating an attribute of the content playback apparatus, and judges whether or not the attribute information meets the predetermined condition.

12. The content playback apparatus of claim 11, wherein the attribute information indicates one of (a) an online device that is normally connected to a network and (b) an offline device that is normally not connected to a network.

13. The content playback apparatus of claim 1, wherein the measurement unit is a counter storing a counter value, and increments the counter value by 1 according to a predetermined frequency.

14. The content playback apparatus of claim 1, wherein the measurement unit is a clock measuring time by managing a current time.

15. The content playback apparatus of claim 1, wherein the license storage unit stores license information including the usable time period and a predetermined condition.

16. The content playback apparatus of claim 1,
    wherein the restriction unit, when the malfunction detection unit detects the malfunction, judges whether or not billing information is to be generated, and when the restriction unit judges that the billing information is to be generated, the restriction unit permits the playback of the content.

17. The content playback apparatus of claim 16,
    wherein the license storage unit stores the license information including the usable time period and billing permissibility information, the billing permissibility information indicating whether or not the billing information is to be generated, and
    wherein the restriction unit includes:
        a determination subunit operable to determine, in accordance with the billing permissibility information included in the license information, whether or not the billing information is to be generated; and
        a billing information generation subunit operable to generate the billing information when the determination subunit determines that the billing information is to be generated.

18. The content playback apparatus of claim 17, wherein the billing information generation subunit reads, from the measurement unit, a value indicating usage elapsed time, and generates the billing information so as to include the read value and reliability level information indicating whether or not the value is reliable.

19. The content playback apparatus of claim 18, further comprising a billing information transmission unit operable to transmit the billing information generated by the billing information generation subunit to a billing server.

20. A content playback method used in a content playback apparatus, the content playback apparatus including (i) a license storage storing license information including a usable time period for which content is usable, and (ii) a measurement unit measuring time, the content playback method comprising:
    a malfunction detection step of detecting a malfunction of the measurement unit;
    a license requesting step of, when the malfunction detection step detects the malfunction, issuing a request to a license server to retransmit the license information and reacquiring the license information from the license server, the license server being a distribution source of the license information and being connected to the content playback apparatus via a network;

a determination step of, when the malfunction detection step has not detected the malfunction, determining that playback of the content is possible when the time measured by the measurement unit is within the usable time period;

a restriction step of, when the malfunction detection step detects the malfunction, placing a restriction on the playback of the content until the license requesting step reacquires the license information; and a playback step of playing back the content when the determination step determines that the playback of the content is possible, wherein the playback step plays back the content when the license requesting step has reacquired the license information.

21. A non-transitory computer-readable recording medium having a content playback program recorded thereon, the content playback program being used in a content playback apparatus including (i) a license storage unit storing license information including a usable time period for which content is usable, and (ii) a measurement unit measuring time, the content playback program causing the content playback apparatus to execute a method comprising:

a malfunction detection step of detecting a malfunction of the measurement unit;

a license requesting step of, when the malfunction detection step detects the malfunction, issuing a request to a license server to retransmit the license information and reacquiring the license information from the license server, the license server being a distribution source of the license information and being connected to the content playback apparatus via a network;

a determination step of, when the malfunction detection step has not detected the malfunction, determining that playback of the content is possible when the time measured by the measurement unit is within the usable time period;

a restriction step of, when the malfunction detection step detects the malfunction, placing a restriction on the playback of the content until the license requesting step reacquires the license information; and a playback step of playing back the content when the determination step determines that the playback of the content is possible, wherein the playback step plays back the content when the license requesting step has reacquired the license information.

\* \* \* \* \*